(12) United States Patent
Hajmohammadi et al.

(10) Patent No.: US 12,277,733 B2
(45) Date of Patent: Apr. 15, 2025

(54) CALIBRATION METHODS AND SYSTEMS FOR AN UNDER-CALIBRATED CAMERA CAPTURING A SCENE

(71) Applicant: Verizon Patent and Licensing Inc., Basking Ridge, NJ (US)

(72) Inventors: Solmaz Hajmohammadi, San Francisco, CA (US); Richard A. Paris, Nashville, TN (US); Daniel M. Michler, Lexington, KY (US); Jie Yu, Natick, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 227 days.

(21) Appl. No.: 18/074,844

(22) Filed: Dec. 5, 2022

(65) Prior Publication Data

US 2024/0185461 A1   Jun. 6, 2024

(51) Int. Cl.
*G06T 7/80* (2017.01)
*H04N 13/246* (2018.01)

(52) U.S. Cl.
CPC ...... *G06T 7/85* (2017.01); *G06T 2207/30196* (2013.01); *G06T 2207/30221* (2013.01); *H04N 13/246* (2018.05)

(58) Field of Classification Search
CPC ............. G06T 7/85; G06T 2207/30196; G06T 2207/30221; G06T 7/80; G06T 2207/30244
See application file for complete search history.

(56) References Cited

U.S. PATENT DOCUMENTS

| | | | | |
|---|---|---|---|---|
| 2003/0202691 A1* | 10/2003 | Beardsley | ................. | G06T 7/85 382/296 |
| 2006/0024041 A1* | 2/2006 | Lou | ........................... | G06T 7/80 396/213 |
| 2011/0025853 A1* | 2/2011 | Richardson | ............ | H04N 23/66 348/E7.085 |
| 2013/0321589 A1* | 12/2013 | Kirk | ........................ | G06T 17/00 348/47 |
| 2014/0285676 A1* | 9/2014 | Barreto | ................ | H04N 17/002 348/333.08 |
| 2015/0213589 A1* | 7/2015 | Chou | ........................ | G06T 7/85 348/47 |
| 2016/0150217 A1* | 5/2016 | Popov | .................. | H04N 13/257 348/47 |

(Continued)

*Primary Examiner* — Jared Walker

(57) ABSTRACT

An illustrative camera calibration system may identify a common feature present within a scene and visible in each of 1) a first image of the scene captured by a first camera from a first pose represented by a first set of calibration parameters, and 2) a second image of the scene captured by a second camera from a second pose represented by a second set of calibration parameters. The system may estimate a 3D position of the common feature with respect to a global coordinate system associated with the scene and determine that the first set of calibration parameters is more accurate than the second set of calibration parameters. In response to this determination, the system may revise the second set of calibration parameters based on the estimated 3D position of the common feature and the first set of calibration parameters. Corresponding methods and systems are also disclosed.

20 Claims, 10 Drawing Sheets

(56) References Cited

U.S. PATENT DOCUMENTS

| | | | |
|---|---|---|---|
| 2016/0180510 A1* | 6/2016 | Grau | G06T 7/85 |
| | | | 348/46 |
| 2017/0034502 A1* | 2/2017 | Aurongzeb | G06T 7/80 |
| 2017/0070731 A1* | 3/2017 | Darling | G06T 7/85 |
| 2018/0322657 A1* | 11/2018 | Dubout | G06V 10/44 |
| 2019/0028688 A1* | 1/2019 | Kumar | H04N 13/246 |
| 2019/0116354 A1* | 4/2019 | Yao | G06T 7/75 |
| 2019/0180475 A1* | 6/2019 | Nash | G06T 7/80 |
| 2019/0362506 A1* | 11/2019 | Leroyer | G09B 19/0038 |
| 2020/0034989 A1* | 1/2020 | Koyama | H04N 17/002 |
| 2020/0134911 A1* | 4/2020 | van Hoff | G06T 7/292 |
| 2020/0312037 A1* | 10/2020 | Kopeinigg | G06T 7/70 |
| 2021/0001776 A1* | 1/2021 | Kim | B60R 1/002 |
| 2021/0027496 A1* | 1/2021 | Koyama | G06T 7/73 |
| 2021/0183102 A1* | 6/2021 | Tang | G06T 15/06 |
| 2021/0233276 A1* | 7/2021 | Ardö | G06T 7/80 |
| 2021/0390738 A1* | 12/2021 | Chandran | H04N 17/002 |
| 2022/0083771 A1* | 3/2022 | Awai | G06V 20/64 |
| 2022/0179056 A1* | 6/2022 | Braley | G01S 17/87 |
| 2022/0398780 A1* | 12/2022 | Pelc | G06T 7/85 |
| 2023/0186518 A1* | 6/2023 | Chou | G06T 7/80 |
| | | | 382/103 |
| 2024/0104776 A1* | 3/2024 | Yoshida | G06T 7/70 |

* cited by examiner

CALIBRATION METHODS AND SYSTEMS FOR AN UNDER-CALIBRATED CAMERA CAPTURING A SCENE

BACKGROUND INFORMATION

Various types of image capture devices (referred to herein as cameras) are used to capture color and/or depth information representing subjects and objects at scenes being captured. For instance, a set of cameras (also referred to as a camera array) may be used to capture still and/or video images depicting the scene using color, depth, grayscale, and/or other image content. Such images may be presented to viewers and/or analyzed and processed for use in various applications.

As one example of such an application, three-dimensional (3D) representations of objects may be produced based on images captured by cameras with different poses (i.e., different positions and/or orientations so as to afford the cameras distinct vantage points) around the objects. As another example, computer vision may be performed to extract information about objects captured in the images and to implement autonomous processes based on this information. These and various other applications of image processing may be used in a variety of entertainment, educational, industrial, agricultural, medical, commercial, robotics, promotional, and/or other contexts and use cases. For instance, extended reality (e.g., virtual reality, augmented reality, etc.) use cases may make use of volumetric models generated based on intensity (e.g., color) and depth images depicting a scene from various vantage points (e.g., various perspectives, various locations, etc.) with respect to the scene.

Proper calibration of cameras (e.g., with respect to a coordinate system associated with the scene being captured, modeled, and/or analyzed) may facilitate optimal functionality for these and other image processing applications whether the cameras are configured to capture intensity data, depth data, or a combination of these or other types of data representing object surfaces. For example, accurate camera calibration may help to enable image processing and/or to eliminate various types of performance and quality issues that might otherwise arise in image processing applications that employ sets of cameras that are not well-calibrated.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF EXAMPLE EMBODIMENTS

Figure 1:
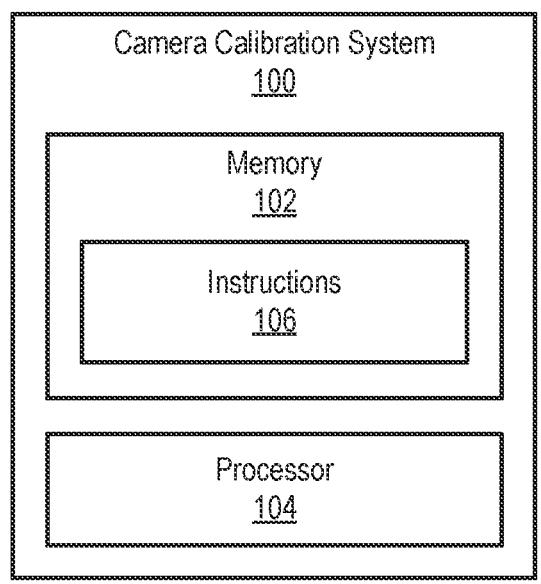
FIG. 1 shows an illustrative camera calibration system configured to identify and calibrate an under-calibrated camera within a set of cameras capturing a scene.

Calibration methods and systems for an under-calibrated camera capturing a scene are described herein. As mentioned above, a camera array including cameras disposed at various poses with respect to a scene may capture useful information about the scene and the objects therein if the cameras in the array are calibrated together so that image content captured by each camera can be accurately correlated with content captured by the others. Traditionally, camera calibration may involve presenting a physical object referred to as a calibration target to multiple cameras in the camera array at the same time. For example, typical calibration targets may include a planar surface (e.g., a flat piece of cardboard, Styrofoam, plastic, etc.) that features a pattern that is easily assessable using automated systems. Such patterns may include chessboard patterns, ArUco patterns, ChArUco patterns, and so forth, all of which include various distinct features (e.g., points where white and black squares meet, etc.) that are readily identifiable in images capturing the calibration targets from different perspectives (i.e., the perspectives afforded by the different poses of the cameras capturing the images). Based on images depicting such calibration targets from different vantage points, calibration systems may correlate where certain features are detected from the different poses, and may mathematically characterize the different poses of the cameras with respective sets of calibration parameters (e.g., extrinsic parameters) associated with each pose.

Cameras that have been calibrated in this way and that are characterized by calibration parameters that relate to a shared space to which other cameras have also been calibrated (e.g., a space that is the basis of calibration parameters for all the cameras in the array) are referred to herein as being amply-calibrated cameras. While this terminology does not indicate a precise accuracy threshold or extent to which the cameras must be in agreement as to the geometric nature of the scene and their poses with respect to the scene, it will be understood that amply-calibrated cameras refer to cameras that have been calibrated in accordance with a calibration procedure and that their calibration is considered to be sufficient or "good enough" for the purposes of the application or use case at hand.

In contrast, other cameras referenced herein will be referred to as under-calibrated cameras. It will be understood that these under-calibrated cameras are not considered to be amply calibrated. For example, under-calibrated cameras may not yet have been calibrated at all, may have been calibrated to some extent but not to a degree of accuracy that is acceptable or ideal for the purposes of the application or use case at hand, may have been accurately calibrated at some time in the past but may no longer be sufficiently calibrated (e.g., due to being bumped, moved, etc.), or the like. In any case, under-calibrated cameras, as the term is used herein, will be understood to lack a sufficient or desirable level of calibration accuracy in comparison to amply-calibrated cameras jointly configured to capture the same scene.

Methods and systems described herein may be configured to detect or otherwise identify, from a set of cameras capturing a scene, an under-calibrated camera that is not as accurately calibrated as other cameras in the set. Upon making this identification, methods and systems described herein may additionally relate to helping bring the calibration of the under-calibrated camera into alignment or agreement with the other cameras in the set. For example, previously-determined extrinsic parameters of the under-calibrated camera (if such parameters have been determined at all) may be revised to make the extrinsic parameters more accurate to the geometric reality of the scene, the camera arrangement, and the pose of the under-calibrated camera with respect to that scene and camera arrangement. When combined with intrinsic parameters accurately characterizing the camera's intrinsic properties (e.g., the focal length of the camera, how the camera may distort an image compared to an ideal pinhole camera model, etc.), these revised extrinsic parameters may become part of an accurate set of calibration parameters that transform the under-calibrated camera into an amply-calibrated camera configured to contribute captured content (that may be efficiently combined with content from other cameras) for any of the applications described herein.

Various benefits and advantages may arise from calibration methods and systems described herein for under-calibrated cameras capturing a scene. For instance, specific examples illustrated and described herein relate to scenarios in which volumetric content is being produced to represent an event occurring at a relatively large scene such as a sporting event venue. An array of cameras may be configured to capture a playing field, for example, on which a sporting event (e.g., a football game, a basketball game, etc.) involving a plurality of players is taking place, and various benefits may be provided.

As a first example, one benefit that calibration methods and systems described herein may deliver involves a mutually-calibrated set of cameras (i.e., a set of cameras that are present at the same scene and have all been calibrated with respect to the scene and/or with respect to one another) that, for whatever reason, includes at least one camera that has become under-calibrated (e.g., the camera may have been inadvertently bumped so that its pose is slightly different than during calibration, etc.). In this scenario, the data provided by the under-calibrated camera may be of limited usefulness due to the inaccuracy of its calibration, and it may be beneficial to the goals of the application if the system can automatically identify that this camera is under-calibrated and bring it back into a state of ample calibration on the fly (e.g., even as the event is being captured at the scene).

As a second example, another benefit that calibration methods and systems described herein may deliver involves one or more cameras that are not necessarily included in a mutually-calibrated set of cameras at a scene. For instance, a particular sporting event (e.g., a professional football game, etc.) may be captured not only by an array of mutually-calibrated cameras arranged at the scene to capture the event for a volumetric reproduction of the game, but also by one or more other cameras (e.g., non-calibrated cameras or cameras calibrated with respect to a different coordinate space, etc.) configured to capture the event for a different purpose (e.g., a television broadcast, live internet videos posted by users, etc.). Content captured by these other cameras may be potentially useful and/or valuable for the volumetric modeling purposes of the mutually-calibrated set of cameras. For example, these non-calibrated cameras may capture views of players or events in the scene from unique vantage points or the like. Unfortunately, this content would generally not be usable for the volumetric content production due to these cameras not being calibrated together with the mutually-calibrated volumetric camera array. Accordingly, calibration methods and systems described herein for converting under-calibrated cameras capturing a scene into amply-calibrated cameras may provide the significant benefit of facilitating use of content captured by these other cameras (e.g., TV cameras, user-captured content, etc.). For example, by determining accurate calibration parameters for such cameras on a frame-by-frame basis (e.g., so that the content may be calibrated even if the cameras are moving, etc.), new and unique captured imagery may be put to use in generating volumetric content that previously was not able to be used.

Various specific implementations will now be described in detail with reference to the figures. It will be understood that the specific implementations described below are provided as non-limiting examples and may be applied in various situations. Additionally, it will be understood that other examples not explicitly described herein may also fall within the scope of the claims set forth below. Methods and systems for calibrating a camera array based on differentiable point targets in a capture scene may provide any or all of the benefits mentioned above, as well as various additional and/or alternative benefits that will be described and/or made apparent below.

FIG. 1 shows an illustrative camera calibration system 100 configured to identify and calibrate an under-calibrated camera within a set of cameras capturing a scene. System 100 may be implemented by computer resources such as processors, memory facilities, storage facilities, communication interfaces, and so forth. For example, system 100 may be implemented by multi-access edge compute (MEC) server systems operating on a provider network (e.g., a cellular data network or other carrier network, etc.), cloud compute server systems running containerized applications or other distributed software, on-premise server systems, user equipment devices, or other suitable computing systems as may serve a particular implementation.

System 100 may include memory resources configured to store instructions, as well as one or more processors communicatively coupled to the memory resources and configured to execute the instructions to perform functions described herein. For example, a generalized representation of system 100 is shown in FIG. 1 to include a memory 102 and a processor 104 selectively and communicatively coupled to one another. Memory 102 and processor 104 may each include or be implemented by computer hardware that is configured to store and/or execute computer software. Various other components of computer hardware and/or software not explicitly shown in FIG. 1 (e.g., networking and communication interfaces, etc.) may also be included within system 100. In some examples, memory 102 and processor 104 may be distributed between multiple devices and/or multiple locations as may serve a particular implementation.

Memory 102 may store and/or otherwise maintain executable data used by processor 104 to perform any of the functionality described herein. For example, memory 102 may store instructions 106 that may be executed by processor 104. Memory 102 may be implemented by one or more memory or storage devices, including any memory or storage devices described herein, that are configured to store data in a transitory or non-transitory manner. Instructions 106 may be executed by processor 104 to cause system 100 to perform any of the functionality described herein. Instructions 106 may be implemented by any suitable application, software, script, code, and/or other executable data instance. Additionally, memory 102 may also maintain any other data accessed, managed, used, and/or transmitted by processor 104 in a particular implementation.

Processor 104 may be implemented by one or more computer processing devices, including general-purpose processors (e.g., central processing units (CPUs), graphics processing units (GPUs), microprocessors, etc.), special-purpose processors (e.g., application-specific integrated circuits (ASICs), field-programmable gate arrays (FPGAs), etc.), or the like. Using processor 104 (e.g., when processor 104 is directed to perform operations represented by instructions 106 stored in memory 102), system 100 may perform functions associated with identifying and calibrating under-calibrated cameras in a camera array in accordance with methods and systems described herein and/or as may serve a particular implementation.

Figure 2:
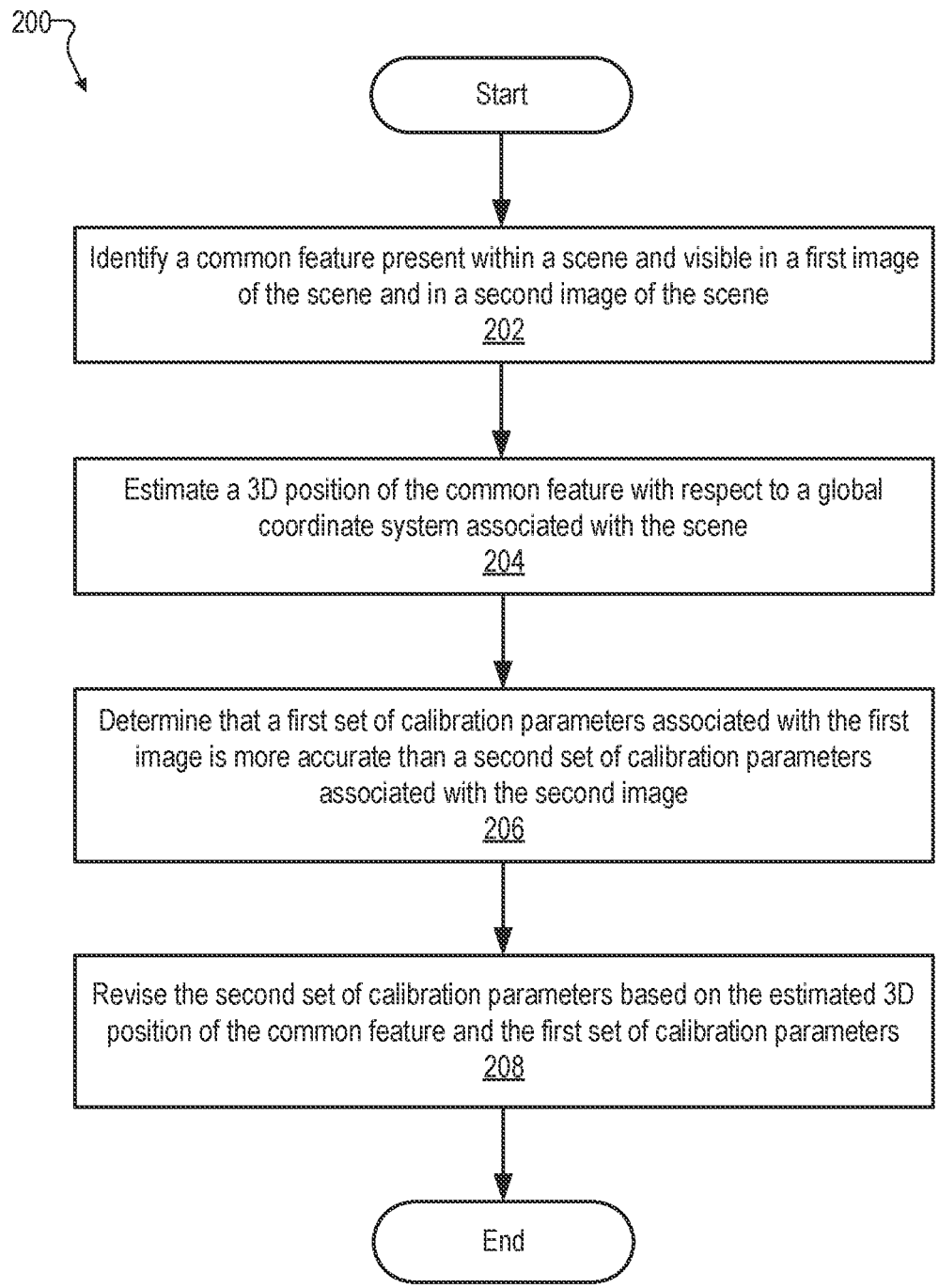
FIG. 2 shows an illustrative method for identifying and calibrating an under-calibrated camera within a set of cameras capturing a scene.

As one example of functionality that processor 104 may perform, FIG. 2 shows an illustrative method 200 for detecting and calibrating an under-calibrated camera within a set of cameras capturing a scene. While FIG. 2 shows illustrative operations according to one implementation, other implementations may omit, add to, reorder, and/or modify any of the operations shown in FIG. 2. In some examples, multiple operations shown in FIG. 2 or described in relation to FIG. 2 may be performed concurrently (e.g., in parallel) with one another, rather than being performed sequentially as illustrated and/or described. One or more of the operations shown in FIG. 2 may be performed by a camera calibration system such as system 100 and/or any implementation thereof.

In certain examples, operations of method 200 may be performed "on-the-fly" and/or in real time so as to provide, receive, process, and/or use data described herein immediately as the data is generated, updated, changed, exchanged, or otherwise becomes available (e.g., analyzing captured images so as to immediately identify and correct a camera that has become under-calibrated, so as to continually calibrate and recalibrate cameras that are moving or otherwise changing their pose, or the like). In such examples, certain operations described herein may involve real-time data, real-time representations, real-time conditions, and/or other real-time circumstances. As used herein, "real time" will be understood to relate to data processing and/or other actions that are performed immediately, as well as conditions and/or circumstances that are accounted for as they exist in the moment when the processing or other actions are performed. For example, a real-time operation may refer to an operation that is performed immediately and without undue delay, even if it is not possible for there to be absolutely zero delay. Similarly, real-time data, real-time representations, real-time conditions, and so forth, will be understood to refer to data, representations, and conditions that relate to a present moment in time or a moment in time when decisions are being made and operations are being performed (e.g., even if after a short delay), such that the data, representations, conditions, and so forth are temporally relevant to the decisions being made and/or the operations being performed.

Each of operations 202-208 of method 200 will now be described in more detail as the operations may be performed by an implementation of system 100 (e.g., by processor 104 executing instructions 106 stored in memory 102).

At operation 202, system 100 may identify a common feature present within a scene and visible in images captured by each of several cameras. For instance, as will be described and illustrated in various example implementations herein, the cameras that capture the common feature from their respective poses may include at least: 1) a plurality of amply-calibrated cameras that are essentially in agreement with regard to their calibration, and 2) one or more under-calibrated cameras that have not yet been calibrated and/or are otherwise not particularly in agreement with the others with regard to their calibration. For clarity and conciseness in the example of method 200, two specific images captured by two different cameras will be understood to depict the common feature identified at operation 202: 1) a first image of the scene captured by a first camera from a first pose represented by a first set of calibration parameters, and 2) a second image of the scene captured by a second camera from a second pose represented by a second set of calibration parameters. It will be understood that the first and second images referred to in this example (as well as other images captured by additional cameras, if applicable) may be captured synchronously with one another (i.e., at least approximately at the same instant in time) so that the depicted imagery represented in each image temporally corresponds to imagery depicted in the other images.

As will be described in more detail below, each of these cameras may be configured to capture color, intensity, and/or depth data in either or both of a still frame or video (frame sequence) format. The first pose of the first camera may allow the first camera to capture the scene from one vantage point that may be complemented by poses of other cameras in a camera array, including by the second pose of the second camera. As such, the first and second poses, along with other poses of other cameras in the array, may allow the camera array to collectively capture the scene from inward-facing perspectives all around the scene (as will be illustrated below).

As mentioned above, operations in method 200 may be performed in real time and/or on-the-fly as the cameras are capturing scene imagery. As such, it will be understood that either of the first or second poses of the cameras (which are represented by the first and second sets of calibration parameters and from which the first and second images are captured) may be temporary poses only and not the permanent poses of the cameras (e.g., if the cameras are moved so as to track the action of a sporting event, etc.). As such, it will be understood that, while the first and/or second sets of calibration parameters may in some cases be intended to be relatively statically associated with the cameras (e.g., if the cameras are intended to remain static in their current poses), in other cases the first and/or second sets of calibration parameters may be relatively rough estimations (e.g., based on a broad feature of the scene such as a corner of a playing field, etc.) intended for temporary use (e.g., for just one frame or a handful of frames) as the camera moves.

However accurate or rough the first and second sets of calibration parameters are at this stage, the aim of operation 202 is that a same feature visible in each of the images be identified so that the first and second sets of calibration parameters can be made as accurate as possible before being used in the processing of the first and second images (or other images captured by the first and second cameras at their current poses) for use cases such as those described herein (e.g., volumetric modeling, etc.). Accordingly, the identification at operation 202 of this common feature may be performed in any suitable way, but, as system 100 may not yet know how accurate or rough the various sets of calibration parameters are, it may be undesirable for system 100 to have to rely on the calibration parameters to identify the common feature in the first and second images. Rather, system 100 may rely on other techniques or insights about the scene and the objects included therein to identify the common feature. For example, a machine learning model available to system 100 may help system 100 understand a particular subject type that the machine learning model has been trained on, such as a human subject type. Using insights from this machine learning model, system 100 may recognize that a human subject having various known characteristics (e.g., body parts such as a head, a torso, two arms, two legs, etc.) is visible in the images. Further using this model, system 100 may identify a common feature that is associated with this human subject and is readily discernible in both the first and second images using the model. For example, the common feature could be the human subject's left elbow, the tip of the human subject's right thumb, the tip of the human subject's nose, or another specific joint that can be identified on the subject.

At operation 204, system 100 may estimate a 3D position of the common feature with respect to a global coordinate system associated with the scene. The global coordinate system may be defined with respect to a static and easily-identifiable feature of the scene (e.g., a corner of a boundary line painted on a playing field, etc.), and the 3D position may be determined based on the first and/or second sets of calibration parameters (and/or possibly other sets of calibration parameters of other cameras that have also captured images in which the common feature can be identified). While at least one set of calibration parameters may be somewhat inaccurate (for an under-calibrated camera that is to be corrected), other sets of calibration parameters should be sufficiently accurate to determine a reasonably accurate estimate of where the feature is located in the scene (i.e., the 3D location) at this step. For example, a triangulation technique based on the various cameras to which the common feature is visible may be employed to make the estimation of operation 204.

At operation 206, system 100 may determine that the first set of calibration parameters represents the first pose more accurately than the second set of calibration parameters represents the second pose. This determination may be made in any suitable way. For instance, in certain cases, it may be known to system 100 ahead of time that the second camera was not involved in a mutual calibration process with the first camera and/or other cameras in an array capturing the scene and operation 206. For example, while the first camera may be part of a mutually-calibrated set of cameras expressly used for capturing content for a volumetric modeling use case at a professional sporting event, the second camera may not be included in this set of cameras since it is present for a different purpose (e.g., a TV broadcast camera operated independently from the volumetric capture project, a security camera at the stadium, a camera operated by an event attendee from a unique angle, etc.). As another example, a user may manually provide user input to system 100 to indicate that the second set of calibration parameters is in question and is to be checked or updated (e.g., if the second camera is known by the user to be under-calibrated, etc.). In these cases, no automatic determination of the validity of the different sets of calibration parameters may be performed and the determination of operation 206 may be performed by calling up the information from memory, receiving the user input, or the like.

In other examples, it may not be known ahead of time that the second camera was not involved in a mutual calibration process with the first camera and/or other cameras in an array capturing the scene. As such, operation 206 may, in these examples, be performed by an automatic determination of the validity of the various sets of calibration parameters. For instance, in some implementations, this automatic determination may involve at least one additional image (a third image) in which the common feature has been identified and which has been captured by a third camera at a third pose different from the first and second poses. If a reprojection of the 3D position of the common feature (as identified at operation 204) into the global coordinate system based on the first and third images and sets of calibration parameters show a basic agreement or alignment between the first and third cameras, while a similar reprojection based on the second image and second set of calibration parameters substantively disagrees or is misaligned with the others, system 100 may interpret this result as the first and third sets of calibration parameters being more accurate than the second set of calibration parameters. As a matter of convention for other examples described below, it is noted that this scenario in which the first and third cameras are amply calibrated while the second camera is an under-calibrated camera with less accurate calibration parameters will be used throughout the present disclosure.

In response to the determining at operation 206 that the first set of calibration parameters is more accurate than the second set of calibration parameters (i.e., the that first set represents the first pose more accurately than the second set represents the second pose), system 100 may proceed to reassess and make adjustments to the second set of calibration parameters (e.g., to correct the second set of calibration parameters with the assumption that the second camera is or has become under-calibrated).

More particularly, at operation 208, system 100 may revise the second set of calibration parameters based on the estimated 3D position of the common feature and the first set of calibration parameters (i.e., the calibration parameters of what has been determined to be an amply-calibrated camera and that have been determined to suitably describe the geometric reality of the scene). The second set of calibration parameters revised at operation 208 may be made to more accurately represent the current and actual pose of the second camera. For example, the calibration parameters may include extrinsic parameters that, when combined with intrinsic parameters defining certain intrinsic characteristics of the second camera, may facilitate accurate and efficient correlation of information captured from the second camera with information captured by other cameras such as the first and/or third cameras (e.g., to facilitate accurate feature matching for volumetric modeling operations or other applications that are to be performed with the calibrated camera array).

Figure 3:
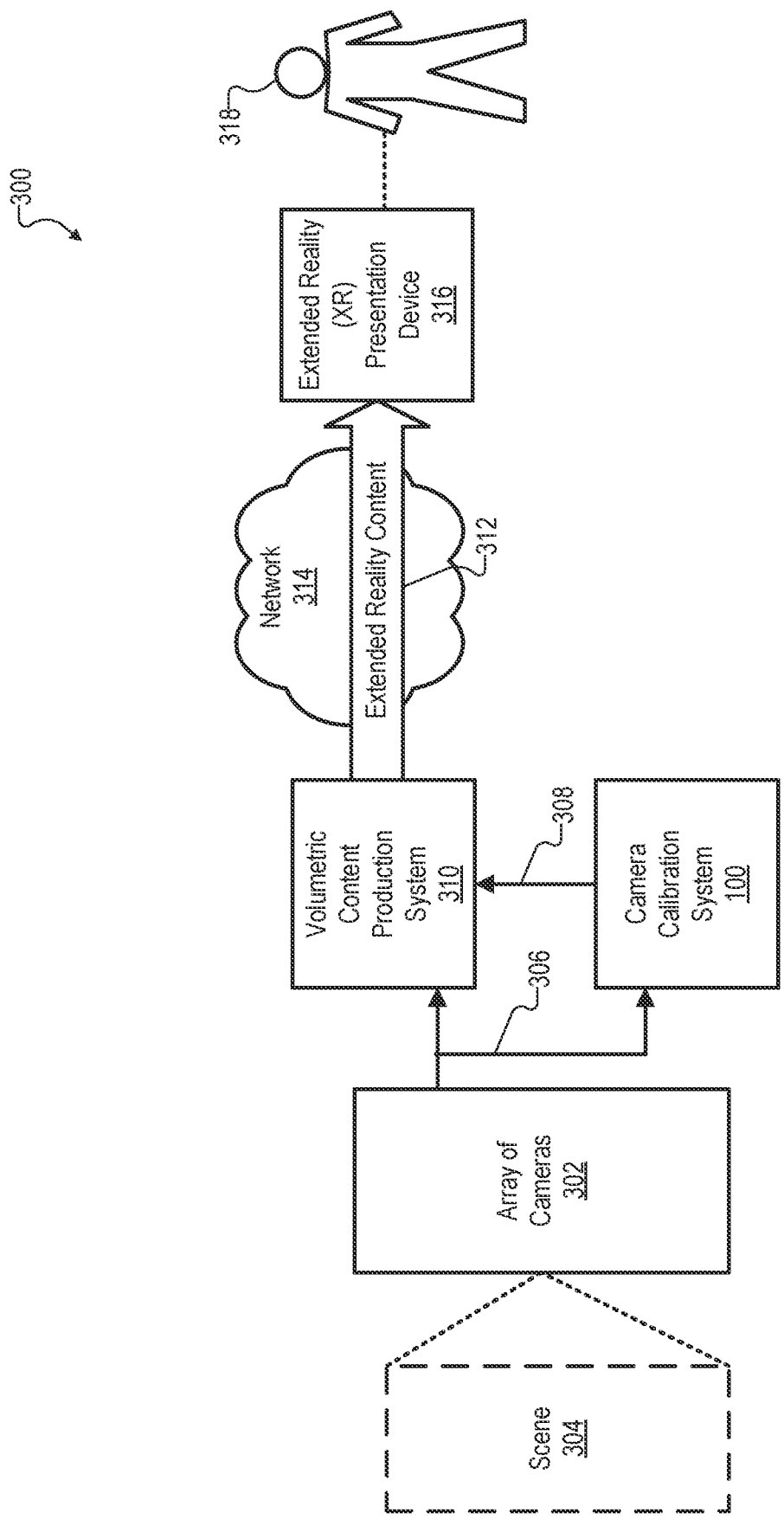
FIG. 3 shows an illustrative configuration in which a camera calibration system may operate to identify and calibrate an under-calibrated camera within a set of cameras capturing a scene in accordance with principles described herein.

FIG. 3 shows an illustrative configuration 300 in which a camera calibration system may operate to identify and calibrate an under-calibrated camera within a set of cameras capturing a scene in accordance with principles described herein. As shown, FIG. 3 includes an implementation of camera calibration system 100, which may operate as described above in relation to FIGS. 1 and 2 and in accordance with additional principles described below. Additionally, configuration 300 explicitly shows an array of cameras 302, which will be understood to include a set of cameras (not individually shown in FIG. 3) configured to capture imagery from various vantage points at a scene 304. Image data 306 is shown to be produced by the array of cameras 302 and to be provided to system 100 for the purpose of generating calibration parameters 308. Image data 306 may represent a plurality of images captured by the various cameras 302 of the array from various poses that the cameras are in with respect to scene 304. System 100 may generate calibration parameters 308 based on the images represented in image data 306 as described above in accordance with method 200 (and as will be further described below).

A volumetric content production system 310 is shown to receive calibration parameters 308 from system 100 and to receive the same or additional image data 306 from the array of cameras 302. Volumetric content production system 310 may analyze and process images represented in this image data 306 in accordance with calibration parameters 308 to generate extended reality content 312, which may be provided by way of a network 314 to an XR presentation device 316 used by a user 318 to engage in an extended reality experience based on the extended reality content.

While configuration 300 represents one particular use case or application of a camera calibration system such as system 100 (i.e., a specific extended reality use case in which image data 306 representing objects in scene 304 is used to generate volumetric representations of the objects for use in presenting an extended reality experience to user 318), it will be understood that system 100 may similarly be used in various other use cases and/or applications as may serve a particular implementation. For example, implementations of system 100 may be used to calibrate camera arrays for use cases that do not involve extended reality content but rather are aimed at more general computer vision applications, object modeling applications, or the like. Indeed, system 100 may be employed for any suitable image processing application or use case in fields such as entertainment, education, manufacturing, medical imaging, robotic automation, or any other suitable field. Thus, while configuration 300 and various examples described and illustrated herein use volumetric object modeling and extended reality content production as an example use case, it will be understood that configuration 300 may be modified or customized in various ways to suit any of these other types of applications or use cases. Each of the elements of configuration 300 will now be described in more detail.

The array of cameras 302 (also referred to herein as image capture devices) may be configured to capture image data (e.g., color data, intensity data, depth data, and/or other suitable types of image data) associated with scene 304 and objects included therein (i.e., objects present at the scene). For instance, the array of cameras 302 may include a synchronized set of video cameras that are each oriented toward the scene and configured to capture color images depicting objects at the scene. Additionally, the same video cameras (or distinct depth capture devices associated with the video cameras) may be used to capture depth images of the objects at the scene using any suitable depth detection techniques (e.g., stereoscopic techniques, time-of-flight techniques, structured light techniques, etc.). As will be illustrated in more detail below, each of cameras 302 included in the array may have a different pose (i.e., position and orientation) with respect to the scene being captured (i.e., scene 304 in this example). The poses of the cameras may be selected, for example, to provide coverage of the scene, or at least of a particular volumetric capture zone within the scene (not explicitly shown in FIG. 3), from various perspectives around the scene so that each object at the scene (including human subjects, animal subjects, inanimate objects, etc.) may be volumetrically modeled in ways described below. For instance, in one example, cameras 302 could be arranged in a circle around scene 304 and could be oriented to face inward toward a center of that circle, while in other examples, the cameras could be arranged in other suitable shapes and configurations.

Scene 304 may represent any real-world area for which image data is captured by the array of cameras 302. Scene 304 may be any suitable size from a small indoor studio space to a large outdoor field or larger space, depending on the arrangement and number of cameras 302 included in the array. Certain scenes 304 may include or otherwise be associated with a particular volumetric capture zone that is defined with an explicit boundary to guarantee a minimum level of coverage by the array of cameras 302 (e.g., coverage from multiple perspectives around the zone) that may not necessarily be provided outside of the zone. For example, for a scene 304 at a sports stadium, the volumetric capture zone may be limited to the playing field on which the sporting event takes place.

Scene 304 may include one or more objects (not explicitly shown in FIG. 3) that are of interest in the application and that are to be volumetrically modeled (e.g., for presentation in an extended reality experience or the like). For instance, scene 304 may include a set of human subjects that are to be volumetrically modeled for presentation as part of the extended reality content. In one example, scene 304 could include a playing field where a sporting event is taking place and being captured by a mutually-calibrated set of cameras and/or by one or more additional cameras that are not part of the mutually-calibrated set (e.g., cameras associated with a TV broadcast, etc.). In this example, the objects of interest within scene 304 could include a set of players engaged in the sporting event on the playing field, as well as referees, a ball and/or other such objects associated with the game, and so forth. In other examples, scene 304 could be implemented in other ways, such as by including a stage where a concert or theatrical performance is taking place, a set for a film or television show where actors are performing, or the like. In any of these examples, a volumetric representation of one or more objects within scene 304 may be generated and provided as part of an extended reality content stream or in another suitable manner.

Figure 4:
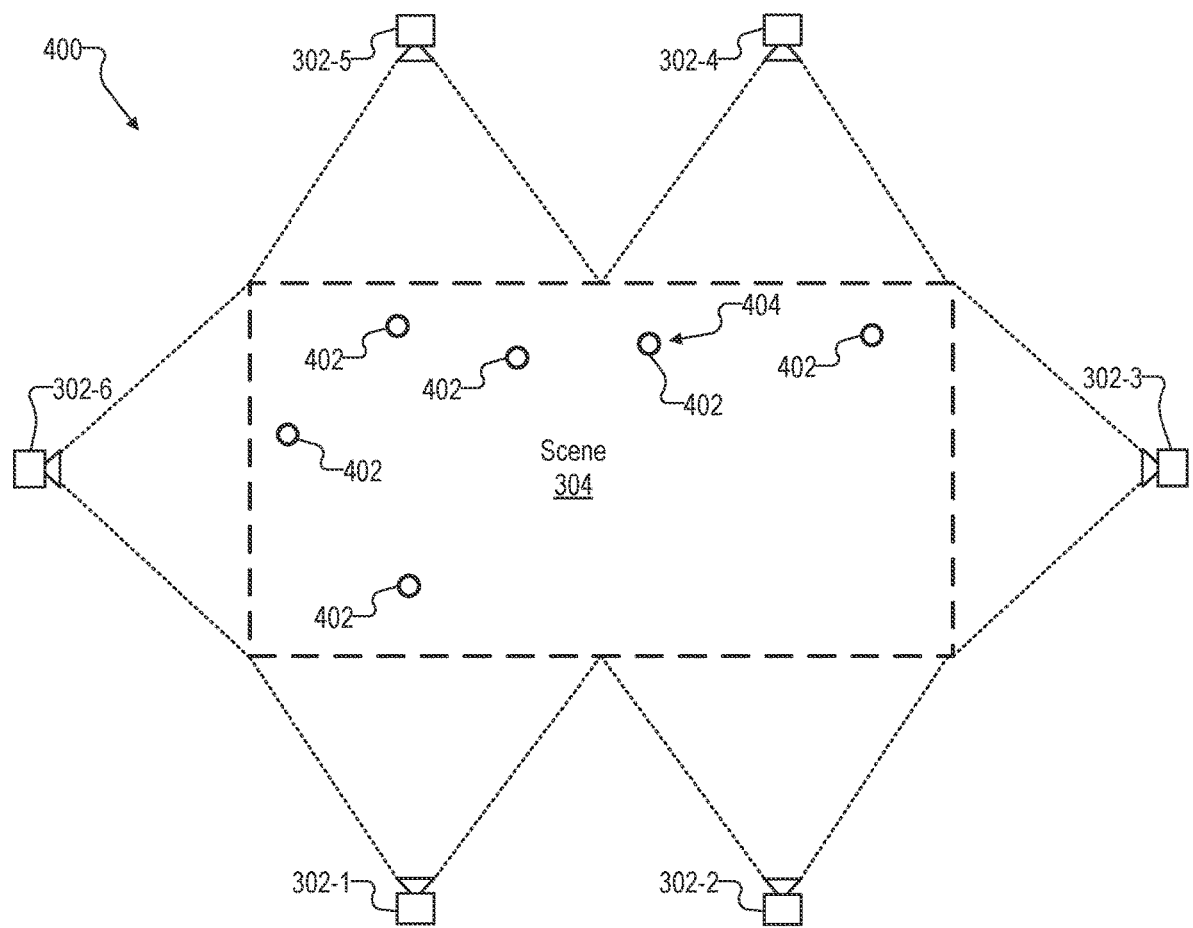
FIG. 4 shows an illustrative scene that includes a plurality of objects and is captured by a set of cameras in accordance with principles described herein.

To illustrate an example of how the array of cameras 302 may be posed with respect to scene 304 and the objects included therein, FIG. 4 shows an illustrative implementation 400 of scene 304 that includes a plurality of objects 402 and that is shown to be captured by an array of six cameras 302 labeled as cameras 302-1 through 302-6. As shown, implementation 400 of scene 304 is depicted from a top view and is associated with a volumetric capture area demarcated by a dashed line in FIG. 4. As mentioned above and as indicated by dotted lines representing the respective fields of view of each camera 302, objects located within the dashed line of the volumetric capture area should normally be captured from various angles by several of cameras 302 (barring another object occluding the view, etc.). In this example, scene 304 is shown to be a rectangular scene surrounded by a set of six cameras 302. Collectively, these cameras 302 may be arranged to capture scene 304 (or at least the volumetric capture area at the scene) from various angles and perspectives, such that information about many sides of any object 402 present within scene 304 can be effectively captured.

In some examples, a coordinate system to which the poses of each of cameras 302 are calibrated may be defined in relation to the cameras 302 themselves, rather than to any static feature of the real world. In other examples, a global coordinate system may be defined relative to a static feature of scene 304 such that the position of each object 402 and the pose of each camera 302 may be mathematically represented in terms of a universal and static coordinate system corresponding to the real world of scene 304. For example, if the dashed line shown in FIG. 4 is an outer boundary of a playing field (where objects 402 represent players engaged in a game on the field), a global coordinate system of this type may be defined with respect to the boundary (e.g., several corners of the boundary as painted on the field, or other recognizable features). In this way, positions of players and other objects 402 may be determined not only in reference to the cameras 302 but also with respect to important features of the field (e.g., at the 40-yard line, 5 feet from a particular side boundary, etc.).

Returning to FIG. 3, image data 306 may represent images (e.g., color or intensity images, depth images, etc.) that are captured by cameras 302 and that depict scene 304 and objects 402 included therein. During a calibration period (e.g., a setup phase, etc.) the objects 402 depicted in these images may include suitable calibration objects such as have been described, whereas during a capture period (e.g., an operational or content production phase after calibration is complete, etc.), the objects 402 depicted in images of image data 306 may be objects of interest for volumetric modeling (e.g., human subjects such as players in the sporting event and so forth, as described above). In some examples, as has been mentioned, calibration and normal operations (e.g., volumetric content production) may be performed concurrently and/or continuously such that the same images represented in image data 306 are sent to and used by both system 100 and volumetric content production system 310. In other examples or at other times, it will be understood that different types of images may be provided to these different systems in accordance with the roles of the systems. For example, image data 306 that is useful for calibration may be provided to system 100 and image data 306 that is useful for volumetric content production may be provided to volumetric content production system 310.

As described above in relation to operation 202, each image represented by image data 306 may be analyzed to identify common features visible within multiple images captured by various cameras 302 (e.g., images captured by a plurality of amply-calibrated cameras and at least one under-calibrated camera). To illustrate certain aspects of how such feature identification may be performed, FIGS. 5A and 5B each show an illustrative image 502 captured by one of cameras 302 shown in FIG. 4 (e.g., camera 302-2). Image 502 will be understood to be represented by the image data 306 provided by the array of cameras 302 to system 100 and to depict a subject 404 present at scene 304. More particularly, as indicated in FIG. 4, subject 404 will be understood to be a particular one of objects 402 shown in this example scene 304.

Figure 5A:
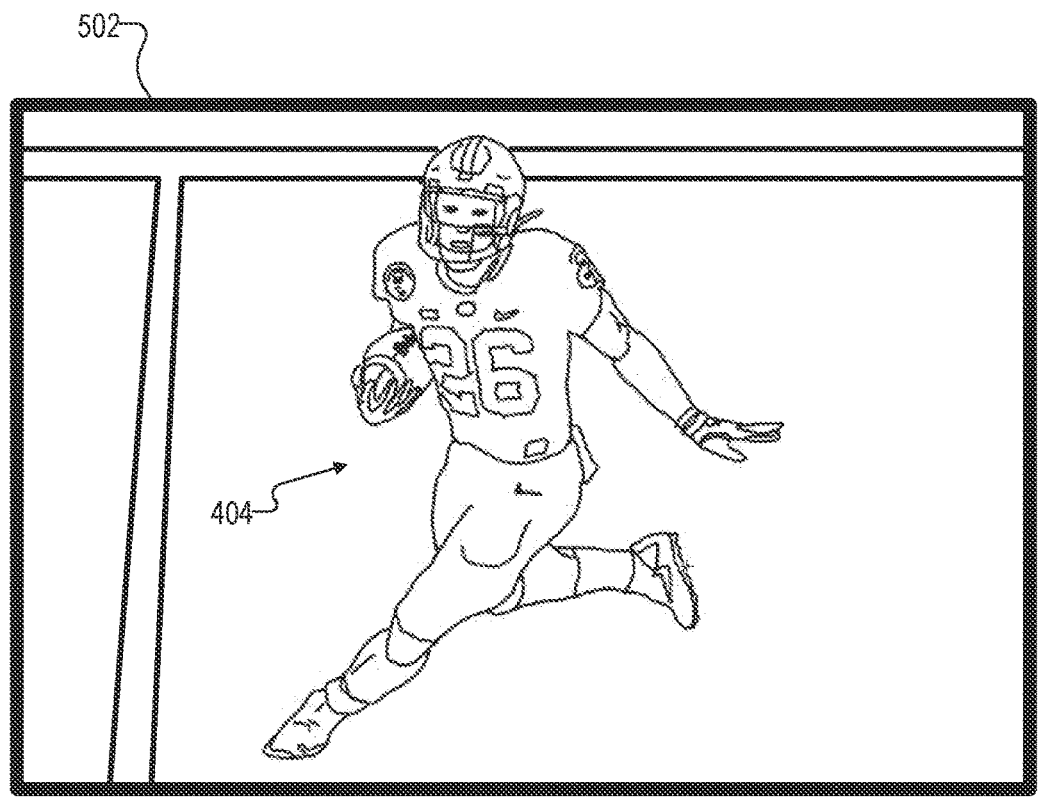
FIG. 5A shows an illustrative image captured by one of the cameras shown in FIG. 4 and depicting a subject present at the scene of FIG. 4.
Figure 5B:
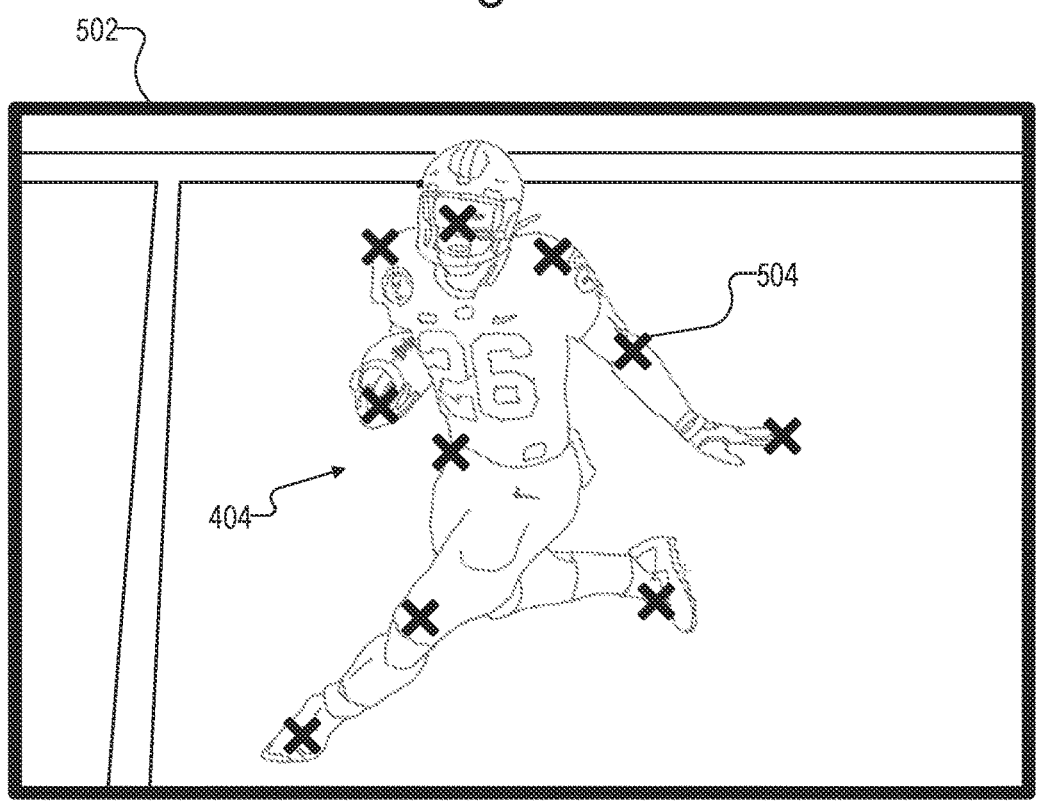
FIG. 5B shows illustrative features, including joints of the subject, that are depicted in the image of FIG. 5A.

While FIG. 5A shows subject 404 (a football player in this example) in the context of a football field included in scene 304 (indicated by lines of the field in the background of image 502) as the image is captured, FIG. 5B shows illustrative features (including joints of subject 404) that may be identified by system 100. These features are shown to be represented by small 'X's at recognizable parts of the body of subject 404 (referred to as joints of the subject) such as the nose, the edge of each shoulder, the visible elbow of the player's left arm, a tip of each index finger, a visible knee of the player's left leg, and the shoelaces of each shoe. The marked features will be understood to be provided by way of example only, and it will be understood that, in other implementations, a variety of other features (e.g., other body parts, other aspects of the players clothing or protective gear, etc.) may be used in addition or as an alternative to those illustrated in FIG. 5B.

As has been described, system 100 may identify a common feature (e.g., one of the joints illustrated by the 'X's in FIG. 5B or another suitable joint of subject 404) that is visible in multiple images captured contemporaneously with image 502 (not explicitly shown in FIG. 5B). For example, if image 502 was captured by camera 302-2 from its pose with respect to scene 304 (as illustrated in FIG. 4), the common feature identified by system 100 may be a particular joint of subject 404, such as the elbow of the left arm labeled in FIG. 5B as feature 504, that is also visible in images captured by at least cameras 302-1 and 302-3 (and likely other cameras 302 as well). Rather than, or in addition to, using the current calibration parameters determined for each camera 302 to determine that the same feature 504 is identified as the common feature in image 502 and other similar images captured by the other cameras, system 100 may rely on insights obtained by way of a machine learning model that facilitates a more holistic analysis of the scene and its contents. For example, subject 404 may be of a particular subject type (i.e., a human subject type in this example) that has a set of joints including the particular joint (i.e., the left elbow in this example), and the identifying of the common feature may include using a machine learning model associated with the particular subject type to recognize the subject and detect the particular joint within the various images (e.g., a first image captured by camera 302-1, image 502 captured by camera 302-2, a third image captured by camera 302-3, etc.). Subject 404 may be recognized by system 100 (using the machine learning model and/or other technologies such as facial recognition, etc.) to be a particular person, and the particular joint of subject 404 may be a particular body part of the particular person (e.g., the left elbow in this example).

Along with facilitating system 100 in identifying features in the images (also referred to as keypoints), a machine learning model associated with a subject type such as the human body may further facilitate system 100 in estimating the location of features that are occluded and not presently visible in a particular image. For example, aided by a machine learning model indicating how the human body is known to move and turn and pose, system 100 may determine approximately where a subject's elbow is likely to be located within a scene even if the elbow happens to be occluded (e.g., by another player) in a particular image. This is because system 100 may determine where other visible features are located with respect to the scene (e.g., the left shoulder, the left hand, etc.) and the machine learning model indicates that the left elbow is to be found between these two joints at a particular angle. Though a lower weight or confidence may be attached to this type of estimate in further analysis relying upon it, the machine learning model may be beneficial in allowing the system to at least estimate where certain joints are expected to be located.

While only a certain common feature 504 is explicitly called out in FIG. 5B for illustrative clarity, it will be understood that several common features may be identified in a similar way as has been described for common feature 504, and estimated locations for each of these common features may be used to determine calibration parameter revisions described below. For example, five to ten common features may be sufficient for system 100 to use a stereo calibration technique to mathematically determine how an under-calibrated camera's calibration parameters ought to be revised to become more accurate. It will be understood that established techniques (e.g., SIFT, SURF, etc.) may be employed to extract the features of a given image prior to applying the machine learning model to make sense of the features and identify which ones are likely to serve as high-confidence, effective common features for the purposes described herein.

Returning to FIG. 3, calibration parameters 308 may be generated by system 100 based on image data 306 and in the ways described herein (e.g., in accordance with method 200 and other principles described below, etc.). Calibration parameters 308 may indicate to volumetric content production system 310 certain physical and geometrical relationships between the poses of cameras 302 within the array of cameras 302 (e.g., with respect to one another and/or with respect to scene 304 or a global coordinate system associated with scene 304). In this way, volumetric content production system 310 may accurately and efficiently correlate image data 306 received from different cameras to generate high-quality volumetric representations of objects at scene 304. In some examples, calibration parameters 308 may include intrinsic calibration parameters defining certain intrinsic characteristics of each camera 302 (e.g., the focal length of the camera, how the camera may distort an image compared to an ideal pinhole camera model, etc.) as well as extrinsic calibration parameters determined by system 100 to define the respective poses of the cameras and thereby facilitate accurate and efficient correlation of information captured from the different cameras (e.g., facilitate accurate feature matching for volumetric modeling operations or other applications that are to be performed with the camera array once all the cameras are suitably calibrated).

Volumetric content production system 310 may be implemented as any suitable computing system (e.g., a MEC server, a cloud server, an on-premise server, a user equipment device, etc.) that is configured to generate extended reality content 312 based on image data 306 captured by the array of cameras 302. As shown in FIG. 3, system 100 may provide calibration parameters 308 to volumetric content production system 310 for the purpose of effectively and efficiently producing volumetric content representative of one or more objects in scene 304. For example, the volumetric content may be produced by volumetric content production system 310 by processing an image set obtained from the array of cameras 302, and the processing of the image set may be performed in accordance with calibration parameters 308 provided by system 100. In this example, the volumetric content produced by volumetric content production system 310 in this way may be integrated with extended reality content 312 that is then provided for presentation by XR presentation device 316.

Extended reality content 312 may be represented by a data stream generated by volumetric content production system 310 that includes volumetric content (e.g., volumetric representations of objects at scene 304, etc.) and/or other data (e.g., metadata, etc.) useful for presenting the extended reality content. As shown, a data stream encoding extended reality content 312 may be transmitted by way of network 314 to XR presentation device 316 so that extended reality content 312 may be presented by the device to user 318. Extended reality content 312 may include any number of volumetric representations of objects 402 (including subject 404) and/or other such content that allows the content, when presented by XR presentation device 316, to provide user 318 with an extended reality experience involving the volumetric object representations. For instance, in the example in which scene 304 includes a playing field where a sporting event is taking place and the objects 402 represented volumetrically in extended reality content 312 are players involved in the sporting event, the extended reality experience presented to user 318 may allow user 318 to immerse himself or herself in the sporting event such as by virtually standing on the playing field, watching the players engage in the event from a virtual perspective of the user's choice (e.g., right in the middle of the action, etc.), and so forth.

Network 314 may serve as a data delivery medium by way of which data may be exchanged between a server domain (in which system 100 and volumetric content production system 310 are included) and a client domain (in which XR presentation device 316 is included). For example, network 314 may be implemented by any suitable private or public networks (e.g., a provider-specific wired or wireless communications network such as a cellular carrier network operated by a mobile carrier entity, a local area network (LAN), a wide area network, the Internet, etc.) and may use any communication technologies, devices, media, protocols, or the like, as may serve a particular implementation.

XR presentation device 316 may represent any device used by user 318 to view volumetric representations of objects 402 generated by volumetric content production system 310 (based on calibration parameters 308 provided by system 100) and included within extended reality content 312 received by way of network 314. For instance, in certain examples, XR presentation device 316 may include or be implemented by a head-mounted extended reality device that presents a fully-immersive virtual reality world, or that presents an augmented reality world based on the actual environment in which user 318 is located (but adding additional augmentations such as volumetric object representations produced and provided by volumetric content production system 310). In other examples, XR presentation device 316 may include or be implemented by a mobile device (e.g., a smartphone, a tablet device, etc.) or another type of media player device such as a computer, a television, or the like.

Figure 6:
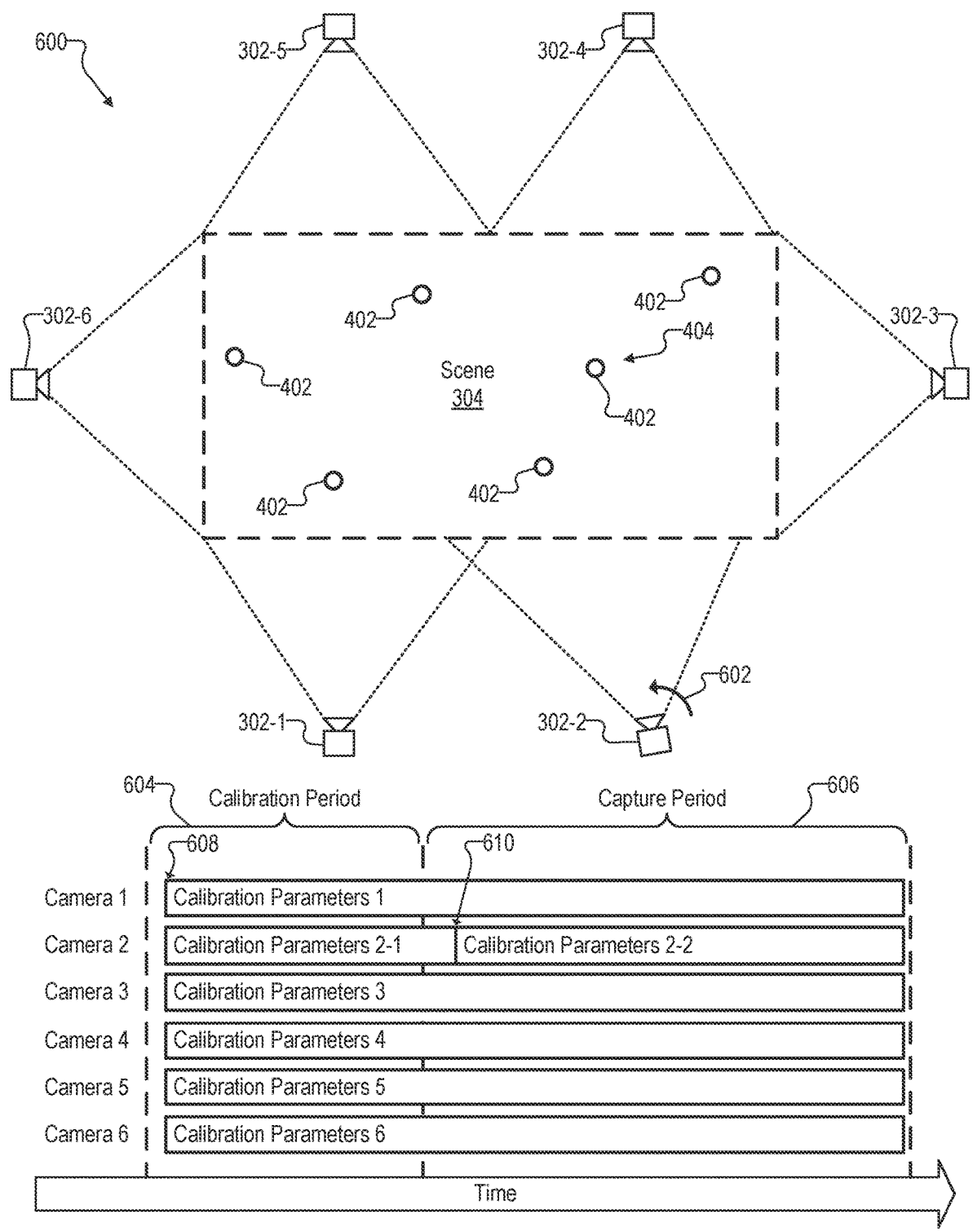
FIG. 6 shows a first illustrative scenario in which an under-calibrated camera capturing a scene is identified and calibrated in accordance with principles described herein.
Figure 7:
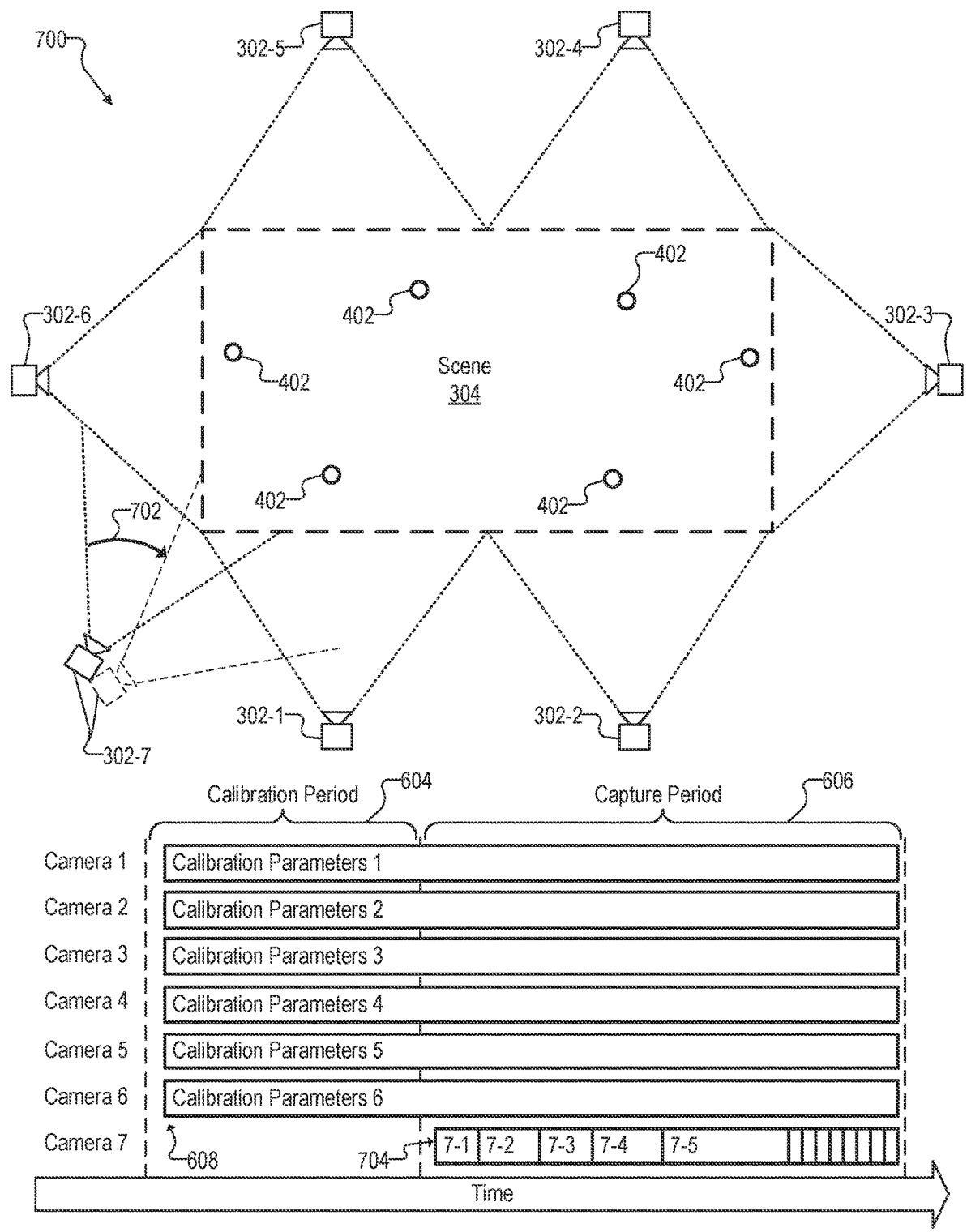
FIG. 7 shows an additional illustrative scenario in which an under-calibrated camera capturing a scene is identified and calibrated in accordance with principles described herein.
Figure 8:
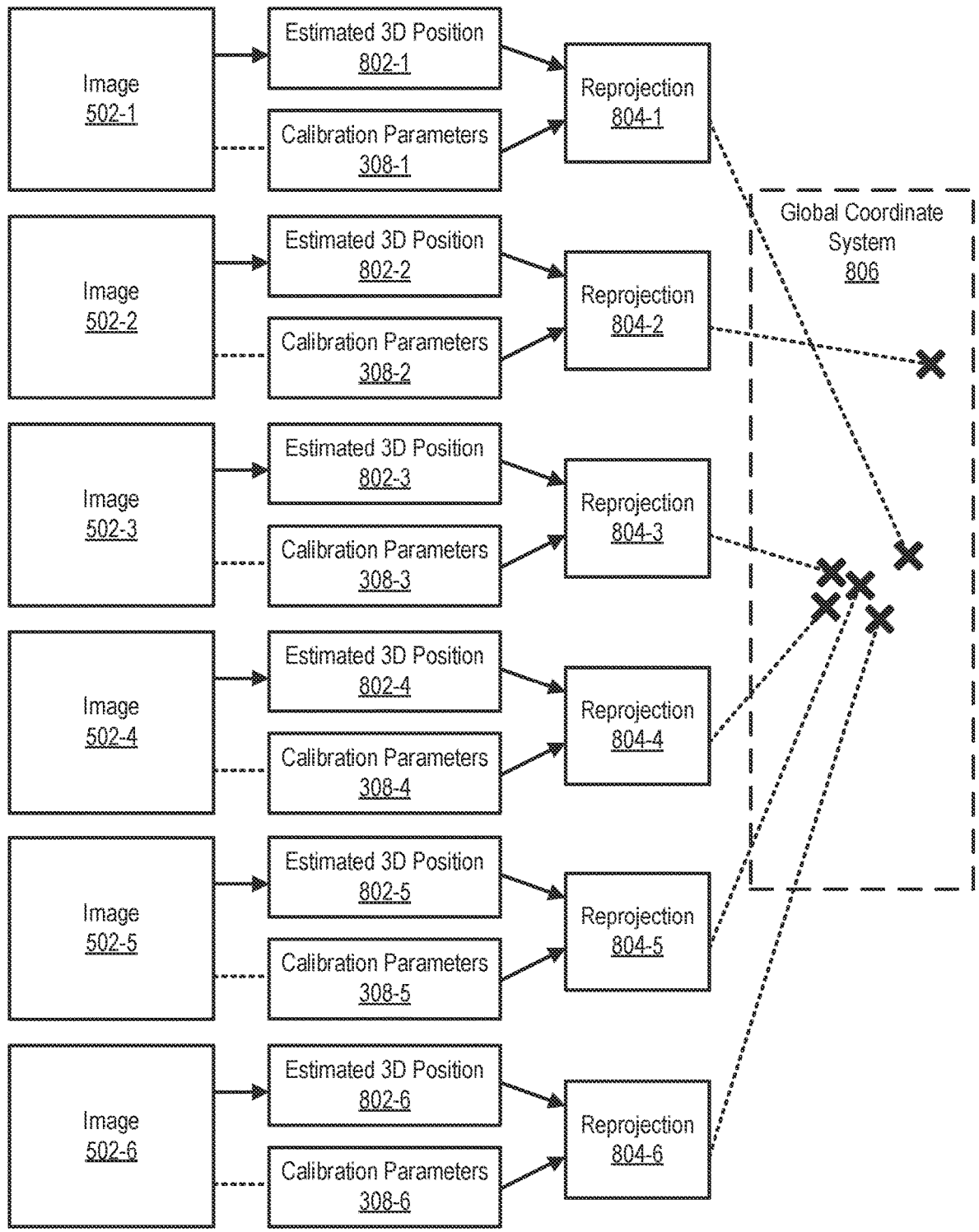
FIG. 8 shows illustrative aspects of how an under-calibrated camera may be detected from amongst a set of cameras capturing a scene.
Figure 9:
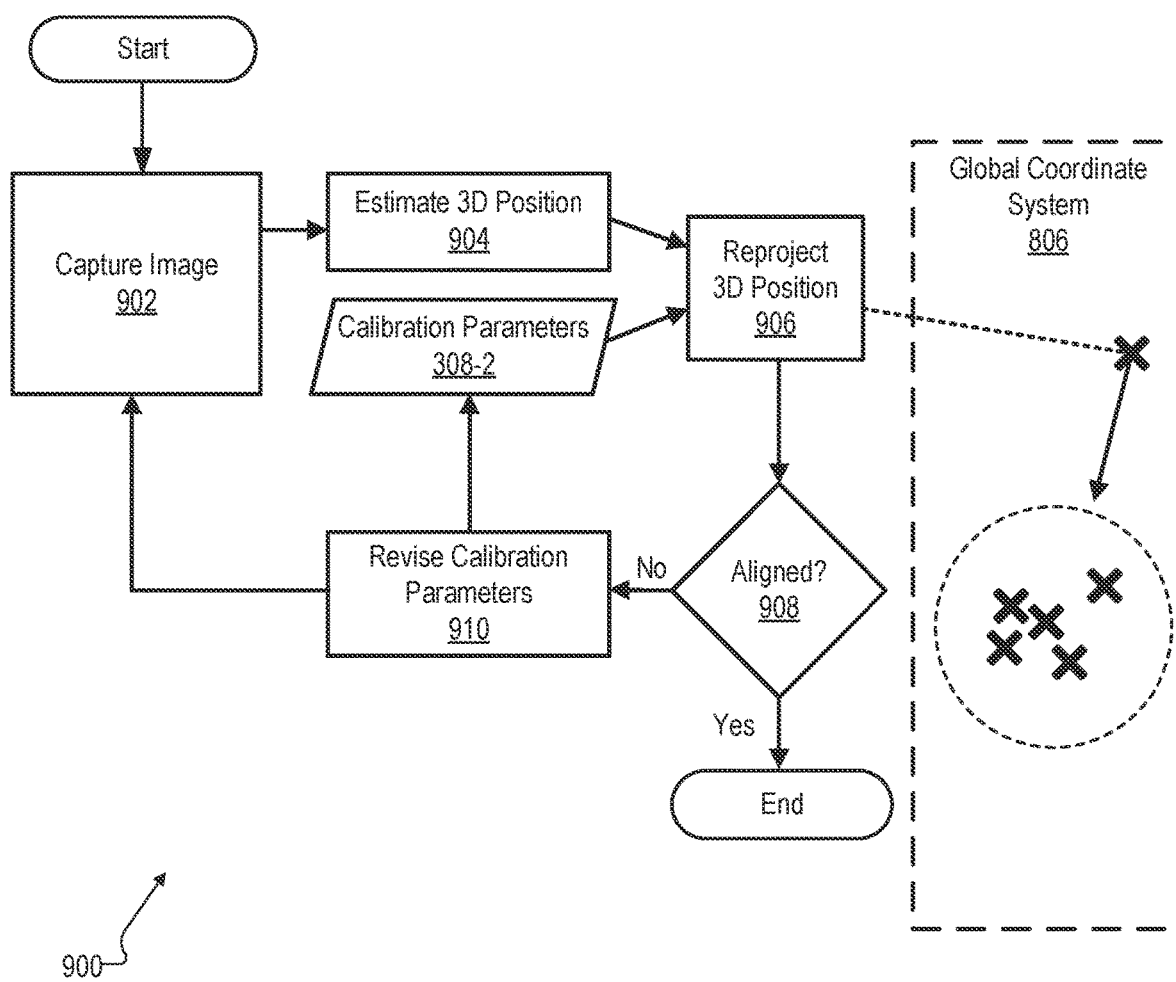
FIG. 9 shows illustrative aspects of how calibration parameters of an under-calibrated camera may be iteratively revised until the calibration of the camera is acceptably aligned with other cameras capturing the scene.
Figure 10:
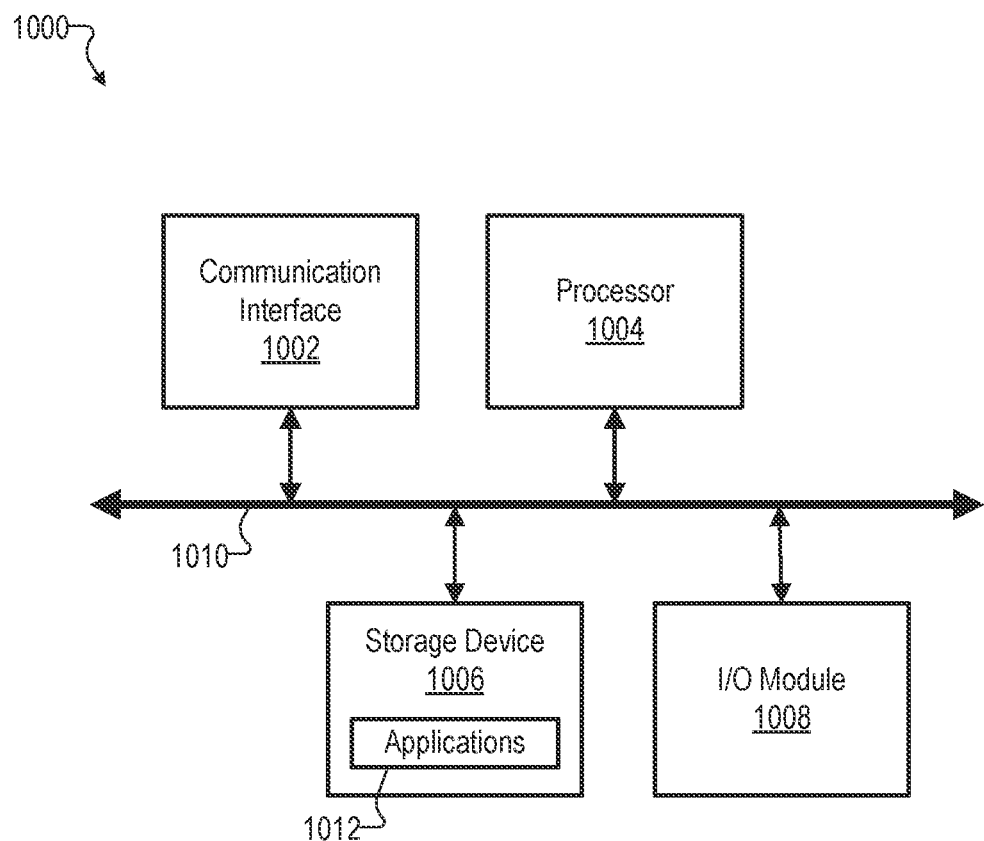
FIG. 10 shows an illustrative computing device that may implement certain of the camera calibration systems and/or other computing systems and devices described herein.

A generalized embodiment of a camera calibration system configured to identify and revise the calibration for an under-calibrated camera capturing a scene has been described in relation to FIG. 1, a generalized method for identifying and calibrating an under-calibrated camera in a set of cameras has been described in relation to FIG. 2, and an example configuration in which a camera calibration system may operate to perform such a method within a context of an extended reality application has been described in relation to FIGS. 3-5. Additional aspects and details associated with such camera calibration systems, methods, and configurations will now be described in relation to FIGS. 6-10. More particularly. FIGS. 6 and 7 show different illustrative scenarios in which an under-calibrated camera capturing a scene may be identified and calibrated in accordance with principles described herein; FIG. 8 shows an example of how an under-calibrated camera may be automatically detected for a scenario in which it is not known ahead of time which camera (if any) in a set of cameras needs to be calibrated or recalibrated; FIG. 9 shows an example flow diagram of how calibration parameters may be iteratively revised to bring an under-calibrated camera into alignment with other amply-calibrated cameras; and FIG. 10 shows an example of a computing device that may implement camera calibration systems and/or other systems and devices described herein.

FIG. 6 shows a first illustrative scenario 600 in which an under-calibrated camera capturing a scene may be detected and calibrated in accordance with principles described herein. In scenario 600, the six cameras 302-1 through 302-6 previously described in relation to FIG. 4 are shown to be the only cameras capturing scene 304. For example, this array of cameras 302 may be understood to be an array of cameras dedicated to capturing data for the production of volumetric content described above for this particular use case. In this type of scenario, each of the cameras 302 included in the set of cameras (e.g., an amply-calibrated camera 302-1 that may represent the "first camera" referred to in method 200 described above and an under-calibrated camera 302-2 that may represent the "second camera" referred to in method 200) may be mutually calibrated to a global coordinate system during a calibration period that occurs prior to a capture period during which an event at scene 304 is captured by this mutually-calibrated set of cameras 302. Then, as will now be described, a change 602 to the pose of camera 302-2 may occur (e.g., the camera may be inadvertently bumped, intentionally reoriented to capture a more desirable view of the scene, etc.) that alters the field of view of the camera and renders the previous calibration of camera 302-2 to be less accurate than before (thereby transforming camera 302-2 from an amply-calibrated camera into an under-calibrated camera).

To illustrate calibration actions of this scenario more specifically, FIG. 6 shows a timeline that depicts a calibration period 604 that occurs prior to a capture period 606. For example, if the event occurring at scene 304 is a football game, the set of cameras 302 may be set up and mutually calibrated to a global coordinate system during a period of time prior to the game beginning (i.e., the calibration period 604) and may be used to capture the game and provide data for volumetric modeling of the game as the game is played (i.e., the capture period 606). At a time 608 during calibration period 604, all of the cameras 302-1 through 302-6 (labeled as "Camera 1" through "Camera 6" in this portion of the figure) are shown to be calibrated with their own respective set of calibration parameters 308 (labeled respectively as "Calibration Parameters 1" through "Calibration Parameters 6" in FIG. 6). As shown, Cameras 1 and 3-6 remain statically posed throughout calibration period 604 and capture period 606 such that their calibration parameters need not change or be updated. For example, the first camera (i.e., Camera 1 or camera 302-1 in this example), will be understood to remain in the first pose shown above during both calibration period 604 and capture period 606.

In contrast to these static cameras and as mentioned above, the second camera (i.e., Camera 2 in this example) may experience change 602 around a time 610 during the capture period (or at some point in time after time 608 when Camera 2 was initially calibrated). As shown, change 602 moves camera 302-2 from an initial pose (shown in FIG. 4 and represented by Calibration Parameters 2-1 at time 608) to a second pose (shown in FIG. 6 and represented by Calibration Parameters 2-2) subsequent to calibration period 604 and during capture period 606. The change from the initial pose to the second pose illustrated in FIG. 6 may be caused by the camera being bumped or repositioned and may involve a reorientation of the camera (e.g., panning, tilting, etc.), a movement of the camera to a different location (e.g., a few feet to the left, etc.), a change of focal length or zoom of the camera (e.g., zooming in, zooming out, etc.), or another suitable change to the pose and vantage point that camera 302-2 has with respect to scene 304.

As shown in FIG. 6, system 100 may determine the first set of calibration parameters of Camera 1 (i.e., Calibration Parameters 1) and other sets of calibration parameters of Cameras 3-6 during calibration period 604 when the first camera is in the first pose and Cameras 3-6 are in their respective static poses. For example, system 100 may determine Calibration Parameters 1 and 3-6 as part of a standard calibration procedure involving a calibration object such as described above. Similarly, in this scenario 600, system 100 may also determine the second set of calibration parameters of Camera 2 (i.e., Calibration Parameters 2-1) during calibration period 604 (when the second camera is in the initial pose) and as part of that same calibration procedure. As will be described in more detail below, the calibration parameters of Camera 2 may then be updated and revised to become Calibration Parameters 2-2 after change 602 has occurred and Camera 2 has become under-calibrated (i.e., at time 610 when Calibration Parameters 2-1 have become less accurate).

FIG. 7 shows an additional illustrative scenario 700 in which an under-calibrated camera capturing a scene may be detected and calibrated in accordance with principles described herein. In scenario 700, the six cameras 302-1 through 302-6 previously described in relation to FIG. 4 are again shown to be present, but, in this scenario, they are not the only cameras capturing scene 304. Rather, in scenario 700, the array of cameras 302-1 through 302-6, which again may be understood to be dedicated to capturing data for the production of volumetric content described above, is shown to be joined by a seventh camera 302-7. As with scenario 600, in scenario 700 each of the cameras 302-1 through 302-6 (e.g., including an amply-calibrated camera 302-1 that may represent the "first camera" referred to in method 200 described above) may be mutually calibrated to a global coordinate system during a calibration period that occurs prior to a capture period during which an event at scene 304 is captured by this mutually-calibrated set of cameras 302. However, in contrast to scenario 600, scenario 700 is also shown to include camera 302-7 (e.g., an under-calibrated camera that may represent the "second camera" referred to in method 200 for this scenario), which will be understood to not be included in the mutually-calibrated set of cameras.

Camera 302-7 may represent a TV broadcast camera, a user-operated camera, or another camera that is not necessarily dedicated to capturing data for the volumetric content production but that might happen to capture information that would be useful for this purpose. Generally, the cameras 302 in the dedicated array of cameras used for capturing data for the volumetric content production (referred to herein as the volumetric camera array) may be statically posed so as to preserve their calibration parameters (as illustrated above in relation to FIG. 6 and with the exception of instances when a camera is bumped or readjusted such as shown for camera 302-2 in scenario 600). This may likely not be the case, however, for cameras such as camera 302-7 that is not part of the volumetric camera array. For example, if camera 302-7 is a camera used for a television broadcast, it not only may not be mutually calibrated with the cameras in the volumetric camera array, but it may be configured to zoom in and out regularly, to pan and tilt to follow the action of the game, and so forth. As such, any calibration parameters determined for camera 302-7 may be transient in nature, perhaps only being accurate and relevant for one video frame or a small handful of frames as the camera is being moved. Accordingly, when camera 302-7 takes the role of the "second camera" (i.e., the under-calibrated camera with the second pose and the second set of calibration parameters that are to be revised as described in method 200), it will be understood that the second pose of this second camera 302-7 may be included with one or more other poses in a series of poses that the second camera moves through (e.g., as the camera tilts, pans, zooms, etc.) during an event at the scene that is being captured. Consequently, it will also be understood that one or more additional sets of calibration parameters (different from the second set of calibration parameters described in detail herein) may be determined for the one or more other poses in the series of poses during the event at the scene. In other words, as camera 302-7 engages in a move 702 from one pose to another, it may move through a series of other poses that would each be characterized by their own respective set of calibration parameters that may need to be determined (e.g., on a frame-by-frame basis if move 702 occurs during the capture period).

To illustrate calibration actions of scenario 700 more specifically (and contrast them with those of scenario 600), FIG. 7 shows a similar timeline to the one shown in FIG. 6 to depict the calibration period 604 and the subsequent capture period 606. Again, for an example football game event occurring at scene 304, the volumetric camera array of Cameras 1 through 6 may be set up and mutually calibrated to the global coordinate system at time 608 before the game begins (i.e., during calibration period 604). As shown, in this scenario, all of these Cameras 1-6 remain statically posed throughout calibration period 604 and capture period 606 (Camera 2 does not get bumped or otherwise moved in this scenario) such that their calibration parameters (i.e., the sets of Calibration Parameters 1-6) are not change or updated.

In contrast to these static cameras of the volumetric camera array, however, the second camera (i.e., Camera 7 in this example) may not be calibrated at all during the calibration period (since it is not included in the mutually-calibrated volumetric camera array). During capture period 606, this second camera may experience move 702 and/or various other similar changes throughout the capture period as the camera is moved in the ways described above. Accordingly, starting at a time 704 during capture period 606, as shown, different sets of calibration parameters (labeled "7-1," "7-2," "7-3," and so forth in FIG. 7) may need to constantly be calculated, including on a frame-by-frame basis at certain times or under certain circumstances as the pose of Camera 7 changes.

Similarly as described in FIG. 6, system 100 may determine the first set of calibration parameters of Camera 1 (i.e., Calibration Parameters 1) and other sets of calibration parameters of Cameras 2-6 during calibration period 604 when the first camera is in the first pose and Cameras 2-6 are in their respective static poses. For example, system 100 may determine Calibration Parameters 1-6 as part of a standard calibration procedure involving a calibration object such as described above. In contrast to scenario 600, however, in scenario 700 system 100 may determine a second set of calibration parameters (e.g., any of Calibration Parameters 7-N shown in FIG. 7) during capture period 606 when the second camera is in a second pose (e.g., any pose of camera 302-7 shown in FIG. 7 as part of move 702). For example, this second set of calibration parameters may be a relatively rough set of calibration parameters that is estimated (e.g., based on a static feature of the scene) at time 704 when it is determined that capture data from Camera 7 is to be used. In other examples, the second set of calibration parameters could be a stale set of calibration parameters from a previous frame that is known to now be at least somewhat inaccurate, or the like.

In cases where the second set of calibration parameters is estimated based on a static feature of the scene (prior to being revised to be more accurate) the static feature may be implemented by any suitable feature of the scene that is visible to the camera and readily recognizable to system 100 so as to help system 100 estimate the approximate pose (and corresponding calibration parameters) of the camera. For instance, in an example such as shown in FIG. 7 where scene 304 is a playing field where a sporting event is captured by the mutually-calibrated set of cameras 302-1 through 302-6 and the second camera 302-7, a static feature upon which the determining of the second set of calibration parameters is based may be a corner of the playing field or another such feature. Subsequently, in accordance with principles described herein, system 100 may select frames in which a human subject (or other object type for which a machine learning model is available) is visible from multiple camera views so that the estimated calibration parameters for camera 302-7 can be revised to become more accurate (i.e., to bring camera 302-7 from being under-calibrated to being amply-calibrated).

As has been mentioned, in certain embodiments and/or situations, system 100 may be able to determine that some sets of calibration parameters represent their respective poses more accurately than others (e.g., to distinguish under-calibrated cameras from amply-calibrated cameras) by accessing data or receiving user input that indicates that the calibration of a particular camera is in question and/or is to be revised. For example, in the case of scenario 700 in which camera 302-7 is not included in the volumetric camera array, system 100 may recognize that camera 302-7 has not yet been calibrated, has been calibrated only roughly, or is constantly in need of being recalibrated (due to being dynamically reoriented rather than statically fixed). Thus, in this case, system 100 may determine that camera 302-7 is under-calibrated based on the fact that it is known not to be in the dedicated set of statically-posed cameras that have been mutually calibrated. As another example, in the case of scenario 600 in which camera 302-2 has been moved in a relatively minor way (e.g., due to being bumped or adjusted to better capture desirable content), system 100 may receive user input (e.g., by way of a user interface provided by system 100 or a related system and from a technician or other user that accidentally bumped the camera or intentionally altered the pose) to indicate to system 100 that camera 302-2 is under-calibrated and should be recalibrated in accordance with principles described herein.

In other embodiments and/or situations, it may be less straightforward for system 100 to make this determination. For example, in cases where it is not known whether a camera has been bumped or altered from its pose, or where it is not known which camera has been so altered if such a change happens to have occurred, system 100 may be configured to automatically determine whether any camera is under-calibrated and which camera or cameras do happen to be (or happen to have become) under-calibrated. This automatic determination may be performed in any suitable way, including by examining images from at least three cameras that have visibility on an identifiable common feature and determining which of these, when reprojecting the detected common feature back into the global coordinate space based on its own calibration parameters, is most out of alignment with the other two or more cameras.

More specifically, referring back to the first camera (which is understood to be amply-calibrated) and the second camera (which is understood to be under-calibrated) referred to in relation to method 200 and other examples that have been described, system 100 may also consider a third camera that will also be understood to be amply-calibrated. More than three cameras may be used to perform the following technique, though it will be understood that at least three cameras (two that are amply-calibrated and one that is under-calibrated) may be in play and system 100 may not know at the outset which of the three or more is the under-calibrated camera. Referring back to method 200 of FIG. 2 to describe one example embodiment of this technique, the identifying of the common feature within the first and second images at operation 202 may further include identifying that the common feature is visible in a third image of the scene captured by a third camera from a third pose represented by a third set of calibration parameters. Then, in connection with operation 206, method 200 may include determining that the third set of calibration parameters represents the third pose more accurately than the second set of calibration parameters represents the second pose. For example, the determining that the first and third sets of calibration parameters respectively represent the first and third poses more accurately than the second set of calibration parameters represents the second pose (e.g., the determining that the second camera is the under-calibrated one, while the first and third are each amply-calibrated) may be based on at least two factors. First, these determinations may be based on an extent to which a first reprojection and a third reprojection of the 3D position (estimated at operation 204) into the global coordinate system are aligned with one another when the first and third reprojections are based, respectively, on the first and third sets of calibration parameters. Second, these determinations may be based on an extent to which a second reprojection of that 3D position into the global coordinate system is misaligned with the first and third reprojections when the second reprojection is based on the second set of calibration parameters.

To illustrate, FIG. 8 shows illustrative aspects of how an under-calibrated camera may be automatically detected from amongst a set of cameras capturing a scene (e.g., for situations in which system 100 has not yet identified which cameras are under-calibrated and amply-calibrated). As shown, a plurality of images 502-1 through 502-6 are illustrated in FIG. 8. These images 502 will be understood to have been captured synchronously (i.e., at approximately the same moment in time) from cameras 302-1 through 302-6, respectively, and to all depict scene 304. As shown with dotted lines connecting to the respective images 502, each image 502-1 through 502-6 is associated with a certain set of calibration parameters 308 (i.e., calibration parameters 308-1 associated with image 502-1, calibration parameters 308-2 associated with image 502-2, and so forth).

For the example of FIG. 8, it will be assumed that a particular common feature associated with a particular subject (e.g., a human subject such as the football player of FIGS. 5A-5B) is identifiable within all of the images 502 represented in FIG. 8. For example, feature 504 (i.e., the left elbow of subject 404) may either be visible within each image or, if it is occluded and not strictly visible, may be otherwise identified based on the position of other visible joints of subject 404 and insight about the human body from a machine learning model.

Based on the current set of calibration parameters 308 associated with each image 502 and where the common feature is detected within the image, FIG. 8 shows that a respective estimated 3D position 802 (i.e., estimated 3D positions 802-1 through 802-6) of the common feature may be computed for each camera. This may be done using a triangulation technique or any other suitable method. For example, estimated 3D position 802-1 may be determined based on calibration parameters 308-1 and the location where the common feature is identified in image 502-1, estimated 3D position 802-2 may be determined based on calibration parameters 308-2 and the location where the common feature is identified in image 502-2, and so forth. In some examples, the estimated 3D position associated with each camera may be understood to be the same 3D position, though its reprojection into the global coordinate system (described below) may still be different for each image due to differences in calibration parameter accuracy for each camera.

Because the various sets of calibration parameters 308 are all determined with respect to a same global coordinate system associated with scene 304, if the identified location of the common feature and the calibration parameters 308 were perfect, the estimated 3D position could be reprojected into the global coordinate system from each camera pose and it would fully align at an identical point in space within the coordinate system. Because of imperfections in the system and the calibration parameters, however, error is likely to be present that prevent this idealized scenario. For example, even the amply-calibrated cameras may have calibration parameters that are "good enough" but not perfect; the feature detection in each of images 502 may locate the common feature with inexact precision (especially if the common feature is not actually visible but determined based on where it "should" be according to the machine learning model); and so forth.

Based on the current respective sets of calibration parameters 308, system 100 may perform respective reprojections 804 (i.e., reprojections 804-1 through 804-6) into a global coordinate system 806 (drawn on the 2D plane, though it will be understood to be a 3D coordinate system) to locate the estimated 3D positions 802 within the coordinate system. This is illustrated in FIG. 8 by dotted lines extending from each reprojection 804 to a respective 'X' within global coordinate system 806. As a result of the various types of errors mentioned above, and particularly as a result of the potential impreciseness of certain sets of calibration parameters 308 (e.g., where the parameters were determined prior to the pose being changed, where the parameters were estimated somewhat roughly based on a static feature of the scene, etc., as described above), the reprojected 'X's shown in FIG. 8 are not all aligned at an identical point within global coordinate system 806. Rather, as shown, while most of the reprojected positions are basically clumped together in approximate agreement or alignment, the reprojected position associated with the second camera (i.e., the reprojection 804-2 based on the set of calibration parameters 308-2) is shown to be a relatively clear outliner from the rest of the group.

System 100 may detect that this reprojection is somewhat anomalous in any suitable way, such as by using a least squares solution to determine a 3D point that minimizes reprojection error (e.g., a center of mass of the reprojections, which would fall somewhere near the partially aligned clump of 'X's). Based on the distance of each reprojected position to this 3D point, a confidence value may be determined and assigned to each camera. For instance, in the example illustrated in FIG. 8, each of cameras 302-1 and 302-3 through 302-6 may be assigned a relatively high confidence score indicating that their sets of calibration parameters are likely to be accurate (due to their relative alignment or proximity to the average 3D point), while camera 302-2 may be assigned a relatively low confidence score indicating that the set of calibration parameters 308-2 are likely to be inaccurate (i.e., camera 302 is likely to be under-calibrated). Based on these confidence values, system 100 may determine that camera 302-2 is under-calibrated and, as such, should be recalibrated (i.e., the set of calibration parameters 308-2 should be revised in accordance with principles described herein). For example, any camera with an assigned confidence value below a certain threshold may be designated as an under-calibrated camera in need of recalibration, while any camera with an assigned confidence value above that threshold may be considered amply calibrated due to the extent that it aligns with the others.

To illustrate how a camera determined to be under-calibrated in this way may be recalibrated and brought into agreement with the other cameras (i.e., made to be amply-calibrated), FIG. 9 shows illustrative aspects of how calibration parameters of an under-calibrated camera (e.g., camera 302-2 in this example) may be iteratively revised until the camera is within an acceptable calibration alignment with other cameras capturing the scene (i.e., until the camera becomes an amply-calibrated camera). More particularly, FIG. 9 shows global coordinate system 806 and illustrates, as already described in relation to FIG. 8, how the calibration of camera 302-2 is out of alignment with the calibration of the other cameras (including at least a first camera such as camera 302-1 and a third camera such as camera 302-3). Together with the global coordinate system 806 and the reprojected positions that have been described (represented by the 'X's), FIG. 9 further shows a flow diagram 900 the includes certain operations 902 through 910. These operations may be performed to revise calibration parameters 308-2 until the 'X' associated with camera 302-2 moves from outside the circle around the clump of other 'X's to inside the circle with the other reprojections.

The circle shown in FIG. 9 will be understood to represent the accuracy threshold described above, such that each 'X' inside the circle may be considered to be associated with an amply-calibrated camera, while any 'X' outside the circle may be considered to be associated with an under-calibrated camera. The arrow attached to the 'X' associated with camera 302-2 indicates that as flow diagram 900 is performed, camera 302-2 may become more accurately calibrated until it can be considered to be amply calibrated along with the other cameras. The accuracy threshold (e.g., represented by the size and position of the circle) may be hard-coded for a particular implementation, automatically and strategically determined based on circumstances of a particular situation (e.g., using a machine learning model or the like), manually set by a user, or otherwise configured in any manner as may serve a particular implementation.

As will be described in more detail below, it will be understood that, in certain implementations, certain or all of the operations of flow diagram 900 may be performed repeatedly to iteratively improve the second set of calibration parameters until the second set of calibration parameters satisfies the accuracy threshold (represented by the circle) that is also satisfied by the remainder of the sets of calibration parameters. Each of the operation in flow diagram will now be described in more detail.

Operation 902 may be the first operation to start the flow diagram and may involve camera 302-2 capturing an image (e.g., image 502-2 in FIG. 8) and providing the image to system 100. While not explicitly shown in flow diagram 900, it will be understood that the image captured at operation 902 may be analyzed to extract features and compared with other images captured by other cameras (not explicitly shown in FIG. 9) to identify a common feature.

Operation 904 may be performed based on the image captured at operation 902 and may involve estimating a 3D position of the common feature that has been identified. Operation 904 may be performed in any of the ways described herein, such as by way of a triangulation technique that relies on the appropriate set of calibration parameters (e.g., the set of calibration parameters 308-2 for this example in which the image was captured by camera 302-2).

Operation 906 may be performed based on the 3D position of the common feature as estimated at operation 904 and further based on the relevant set of calibration parameters (e.g., calibration parameters 308-2 in this example). The reprojection into global coordinate system 806 may be performed as described above, and, as shown in FIG. 9, may (at least the first time it is performed) result in a reprojection that substantially misaligns with corresponding reprojections associated with other cameras. To illustrate, in FIG. 9, the 'X' corresponding to camera 2 (extending from operation 906 with a dotted line) is shown to be outside the circle, thereby indicating that the first time operation 906 is performed, the reprojection indicates that calibration parameters 308-2 fail to satisfy the accuracy threshold represented by the circle in global coordinate system 806.

Operation 908 may be performed in response to operation 906 and may involve determining whether the reprojected 3D position is adequately aligned with other reprojections. For example, operation 908 may involve using a least squares method (as described above) to identify a central 3D point representing an average of all the reprojections, determining a radius (i.e., an accuracy threshold) from that center point that is considered to be sufficiently close for the camera to be amply calibrated, determining the distance between each reprojection and the center, and determining whether each reprojection falls within the accuracy threshold radius (e.g., whether each 'X' is contained within the sphere made by the central 3D point and the determined radius, which is illustrated by the 2D circle in FIG. 9). If the reprojected 3D position is determined to be aligned at operation 908 (e.g., if the 'X' for camera 302-2 satisfies the accuracy threshold and falls within the circle), flow diagram 900 may follow the arrow labeled "Yes" and the process may be complete (since camera 302-2 is now determined to be amply calibrated). Conversely, if the reprojected 3D position is determined to be misaligned at operation 908 (e.g., if the 'X' for camera 302-2 fails to satisfy the accuracy threshold and remains outside the circle), flow diagram 900 may follow the arrow labeled "No" to operation 910.

Operation 910 may involve revising the designated set of calibration parameters (i.e., in this case, the set of calibration parameters 308-2) to attempt to make them more accurate so that, when the process of flow diagram 900 is performed iteratively, the reprojection associated with camera 2 comes more and more into alignment with the others (i.e., so that the 'X' outside the circle moves toward the circle and eventually enters it, as described above).

The revising of the calibration parameters at operation 910 may be performed in any suitable way and/or leveraging any suitable technique. For example, in certain implementations, the revising of the second set of calibration parameters 308-2 may be performed using a stereo calibration technique. Operation 910 may recalibrate a camera in accordance with what is known about the accuracy of the current calibration parameters (e.g., the confidence value described above, etc.) as well as accounting for the weight or confidence of other factors such as how accurate the estimated 3D position of the common feature is likely to be (e.g., based on how good of visibility there is of the feature in the image or whether the feature was occluded and the machine learning model was relied on, etc.), how misaligned the current calibration parameters are from the others, and so forth. It will be understood that a stereo calibration technique may involve more than the one common feature that has been described for this example. For instance, certain stereo calibration technique may use at least six free variables in the calculation, such that a system of equations may be formed with six variables (nonlinearly) or twelve variables (linearly). It will be understood that with enough variables, matrix decomposition may be used to solve for the twelve variables and compute the new calibration parameters (e.g., the revisions for the current calibration parameters). As mentioned above, any suitable weighting terms may be added to the closed loop calculation (e.g., a diagonal matrix assigning weights to each equation in an overdetermined system) to account for the system's confidence regarding the various terms.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium (e.g., a memory, etc.), and executes those instructions, thereby performing one or more operations such as the operations described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random-access memory (DRAM), which typically constitutes a main memory. Common forms of computer-readable media include, for example, a disk, hard disk, magnetic tape, any other magnetic medium, a compact disc read-only memory (CD-ROM), a digital video disc (DVD), any other optical medium, random access memory (RAM), programmable read-only memory (PROM), electrically erasable programmable read-only memory (EPROM), FLASH-EEPROM, any other memory chip or cartridge, or any other tangible medium from which a computer can read.

FIG. 10 shows an illustrative computing device 1000 that may implement certain of the camera calibration systems and/or other computing systems and devices described herein. For example, computing device 1000 may include or implement (or partially implement) a camera calibration system such as system 100, one or more cameras such as any of cameras 302 described herein, a volumetric content production system such as volumetric content production system 310, an XR presentation device such as XR presentation device 316, certain elements of a network such as network 314, and/or any other computing devices or systems described herein (or any elements or subsystems thereof).

As shown in FIG. 10, computing device 1000 may include a communication interface 1002, a processor 1004, a storage device 1006, and an input/output (I/O) module 1008 communicatively connected via a communication infrastructure 1010. While an illustrative computing device 1000 is shown in FIG. 10, the components illustrated in FIG. 10 are not intended to be limiting. Additional or alternative components may be used in other embodiments. Components of computing device 1000 shown in FIG. 10 will now be described in additional detail.

Communication interface 1002 may be configured to communicate with one or more computing devices. Examples of communication interface 1002 include, without limitation, a wired network interface (such as a network interface card), a wireless network interface (such as a wireless network interface card), a modem, an audio/video connection, and any other suitable interface.

Processor 1004 generally represents any type or form of processing unit capable of processing data or interpreting, executing, and/or directing execution of one or more of the instructions, processes, and/or operations described herein. Processor 1004 may direct execution of operations in accordance with one or more applications 1012 or other computer-executable instructions such as may be stored in storage device 1006 or another computer-readable medium.

Storage device 1006 may include one or more data storage media, devices, or configurations and may employ any type, form, and combination of data storage media and/or device. For example, storage device 1006 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1006. For example, data representative of one or more executable applications 1012 configured to direct processor 1004 to perform any of the operations described herein may be stored within storage device 1006. In some examples, data may be arranged in one or more databases residing within storage device 1006.

I/O module 1008 may include one or more I/O modules configured to receive user input and provide user output. One or more I/O modules may be used to receive input for a single virtual experience. I/O module 1008 may include any hardware, firmware, software, or combination thereof supportive of input and output capabilities. For example, I/O module 1008 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1008 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1000. For example, one or more applications 1012 residing within storage device 1006 may be configured to direct processor 1004 to perform one or more processes or functions associated with processor 104 of system 100. Likewise, memory 102 of system 100 may be implemented by or within storage device 1006.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

In the preceding description, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
   identifying, by a camera calibration system, a common feature present within a scene and visible in each of:
     a first image of the scene captured by a first camera from a first pose represented by a first set of calibration parameters, and
     a second image of the scene captured by a second camera from a second pose represented by a second set of calibration parameters;
   estimating, by the camera calibration system, a 3D position of the common feature with respect to a global coordinate system associated with the scene;
   determining, by the camera calibration system, that the first set of calibration parameters represents the first pose more accurately than the second set of calibration parameters represents the second pose; and
   revising, by the camera calibration system and in response to the determining that the first set of calibration parameters represents the first pose more accurately than the second set of calibration parameters represents the second pose, the second set of calibration parameters based on the estimated 3D position of the common feature and the first set of calibration parameters;
   wherein the second pose of the second camera is included with one or more other poses in a series of poses that the second camera moves through during an event at the scene that is being captured; and
   wherein one or more additional sets of calibration parameters different from the second set of calibration parameters are determined for the one or more other poses in the series of poses during the event at the scene.

2. The method of claim 1, wherein:
   the common feature is a particular joint of a subject present at the scene, the subject being of a particular subject type that has a set of joints including the particular joint; and
   the identifying of the common feature includes using a machine learning model associated with the particular subject type to recognize the subject and detect the particular joint within each of the first and second images.

3. The method of claim 2, wherein the particular subject type is a human subject type, the subject present at the scene is a particular person, and the particular joint of the subject is a particular body part of the particular person.

4. The method of claim 1, wherein both the first camera and the second camera are included in a set of cameras that is mutually calibrated to the global coordinate system during a calibration period that occurs prior to a capture period during which an event at the scene is captured by the mutually-calibrated set of cameras.

5. The method of claim 4, wherein:
   the first camera is in the first pose during both the calibration period and the capture period;
   the second camera changes from an initial pose to the second pose subsequent to the calibration period and during the capture period prior to the second image being captured; and
   the method further comprises:
     determining, by the camera calibration system during the calibration period when the first camera is in the first pose and as part of a calibration procedure involving a calibration object, the first set of calibration parameters; and
     determining, by the camera calibration system during the calibration period when the second camera is in the initial pose and as part of the calibration procedure, the second set of calibration parameters.

6. The method of claim 1, wherein:
   the first camera is included in a set of cameras that is mutually calibrated to the global coordinate system during a calibration period that occurs prior to a capture period during which an event at the scene is captured by the mutually-calibrated set of cameras; and
   the second camera is not included in the mutually-calibrated set of cameras.

7. The method of claim 6, wherein:
   the first camera is in the first pose during both the calibration period and the capture period; and
   the method further comprises:
     determining, by the camera calibration system during the calibration period when the first camera is in the first pose and as part of a calibration procedure involving a dedicated calibration object, the first set of calibration parameters; and
     determining, by the camera calibration system during the capture period when the second camera is in the second pose and based on a static feature of the scene, the second set of calibration parameters.

8. The method of claim 7, wherein:
   the scene is a playing field where a sporting event is captured by the mutually-calibrated set of cameras and the second camera; and
   the static feature upon which the determining of the second set of calibration parameters is based is a corner of the playing field.

9. The method of claim 1, wherein:
   the identifying of the common feature further includes identifying that the common feature is visible in a third image of the scene captured by a third camera from a third pose represented by a third set of calibration parameters;
   the method further includes determining that the third set of calibration parameters represents the third pose more accurately than the second set of calibration parameters represents the second pose;

the estimating of the 3D position of the common feature is performed using a triangulation technique based on the first and third images and the first and third sets of calibration parameters; and the revising of the second set of calibration parameters is performed using a stereo calibration technique.

10. The method of claim 9, wherein the estimating of the 3D position of the common feature and the revising of the second set of calibration parameters are performed repeatedly to iteratively improve the second set of calibration parameters until the second set of calibration parameters satisfies an accuracy threshold that is also satisfied by the first and third sets of calibration parameters.

11. The method of claim 1, wherein:
the identifying of the common feature further includes identifying that the common feature is visible in a third image of the scene captured by a third camera from a third pose represented by a third set of calibration parameters;

the method further includes determining that the third set of calibration parameters represents the third pose more accurately than the second set of calibration parameters represents the second pose; and the determining that the first and third sets of calibration parameters respectively represent the first and third poses more accurately than the second set of calibration parameters represents the second pose is based on:
an extent to which a first reprojection and a third reprojection of the 3D position into the global coordinate system are aligned with one another when the first and third reprojections are based, respectively, on the first and third sets of calibration parameters, and an extent to which a second reprojection of the 3D position into the global coordinate system is misaligned with the first and third reprojections when the second reprojection is based on the second set of calibration parameters.

12. A system comprising:
a memory storing instructions; and
one or more processors communicatively coupled to the memory and configured to execute the instructions to perform a process comprising:
identifying a common feature present within a scene and visible in each of:
a first image of the scene captured by a first camera from a first pose represented by a first set of calibration parameters, and
a second image of the scene captured by a second camera from a second pose represented by a second set of calibration parameters;
estimating a 3D position of the common feature with respect to a global coordinate system associated with the scene;
determining that the first set of calibration parameters represents the first pose more accurately than the second set of calibration parameters represents the second pose; and
revising, in response to the determining that the first set of calibration parameters represents the first pose more accurately than the second set of calibration parameters represents the second pose, the second set of calibration parameters based on the estimated 3D position of the common feature and the first set of calibration parameters;

wherein the second pose of the second camera is included with one or more other poses in a series of poses that the second camera moves through during an event at the scene that is being captured; and wherein one or more additional sets of calibration parameters different from the second set of calibration parameters are determined for the one or more other poses in the series of poses during the event at the scene.

13. The system of claim 12, wherein:
the common feature is a particular joint of a subject present at the scene, the subject being of a particular subject type that has a set of joints including the particular joint; and the identifying of the common feature includes using a machine learning model associated with the particular subject type to recognize the subject and detect the particular joint within each of the first and second images.

14. The system of claim 13, wherein the particular subject type is a human subject type, the subject present at the scene is a particular person, and the particular joint of the subject is a particular body part of the particular person.

15. The system of claim 12, wherein both the first camera and the second camera are included in a set of cameras that is mutually calibrated to the global coordinate system during a calibration period that occurs prior to a capture period during which an event at the scene is captured by the mutually-calibrated set of cameras.

16. The system of claim 12, wherein:
the first camera is included in a set of cameras that is mutually calibrated to the global coordinate system during a calibration period that occurs prior to a capture period during which an event at the scene is captured by the mutually-calibrated set of cameras; and the second camera is not included in the mutually-calibrated set of cameras.

17. The system of claim 12, wherein:
the identifying of the common feature further includes identifying that the common feature is visible in a third image of the scene captured by a third camera from a third pose represented by a third set of calibration parameters;

the process further includes determining that the third set of calibration parameters represents the third pose more accurately than the second set of calibration parameters represents the second pose; and the determining that the first and third sets of calibration parameters respectively represent the first and third poses more accurately than the second set of calibration parameters represents the second pose is based on:
an extent to which a first reprojection and a third reprojection of the 3D position into the global coordinate system are aligned with one another when the first and third reprojections are based, respectively, on the first and third sets of calibration parameters, and an extent to which a second reprojection of 3D position into the global coordinate system is misaligned with the first and third reprojections when the second reprojection is based on the second set of calibration parameters.

18. A non-transitory computer-readable medium storing instructions that, when executed, direct a processor of a computing device to perform a process comprising:
identifying a common feature present within a scene and visible in each of:

a first image of the scene captured by a first camera from a first pose represented by a first set of calibration parameters, and a second image of the scene captured by a second camera from a second pose represented by a second set of calibration parameters;

estimating a 3D position of the common feature with respect to a global coordinate system associated with the scene;

determining that the first set of calibration parameters represents the first pose more accurately than the second set of calibration parameters represents the second pose; and revising, in response to the determining that the first set of calibration parameters represents the first pose more accurately than the second set of calibration parameters represents the second pose, the second set of calibration parameters based on the estimated 3D position of the common feature and the first set of calibration parameters;

wherein the second pose of the second camera is included with one or more other poses in a series of poses that the second camera moves through during an event at the scene that is being captured; and wherein one or more additional sets of calibration parameters different from the second set of calibration parameters are determined for the one or more other poses in the series of poses during the event at the scene.

19. The non-transitory computer-readable medium of claim 18, wherein:

the common feature is a particular joint of a subject present at the scene, the subject being of a particular subject type that has a set of joints including the particular joint; and the identifying of the common feature includes using a machine learning model associated with the particular subject type to recognize the subject and detect the particular joint within each of the first and second images.

20. The non-transitory computer-readable medium of claim 19, wherein the particular subject type is a human subject type, the subject present at the scene is a particular person, and the particular joint of the subject is a particular body part of the particular person.

* * * * *